United States Patent
Yannuzzi, Jr.

[11] Patent Number: 5,952,025
[45] Date of Patent: *Sep. 14, 1999

[54] BAG AND METHOD OF MAKING THE SAME

[75] Inventor: Gilbert N. Yannuzzi, Jr., Ames, Iowa

[73] Assignee: American Packaging Corporation, Philadelphia, Pa.

[ * ] Notice: This patent is subject to a terminal disclaimer.

[21] Appl. No.: 08/597,365

[22] Filed: Feb. 8, 1996

Related U.S. Application Data

[63] Continuation-in-part of application No. 08/301,853, Sep. 7, 1994, Pat. No. 5,814,382, which is a continuation-in-part of application No. 08/278,919, Jul. 22, 1994, Pat. No. 5,786,010.

[51] Int. Cl.$^6$ ..................................................... B65D 85/00
[52] U.S. Cl. .............................. 426/107; 53/451; 53/452; 53/469; 53/476; 383/109; 383/120; 383/121; 426/113; 428/201; 428/343
[58] Field of Search ..................................... 426/107, 113; 428/201, 343; 53/451, 452, 469, 476; 383/109, 120, 121

[56] References Cited

U.S. PATENT DOCUMENTS

| | | | |
|---|---|---|---|
| 4,804,573 | 2/1989 | McCarthy et al. | 428/201 |
| 5,314,252 | 5/1994 | Happ | 383/120 X |
| 5,377,474 | 1/1995 | Kovacs et al. | 53/451 X |
| 5,474,383 | 12/1995 | Zuege et al. | 383/121 |

*Primary Examiner*—Leo B. Tentoni
*Attorney, Agent, or Firm*—John F.A. Earley; John F.A. Earley III; Harding, Earley, Follmer & Frailey

[57] ABSTRACT

A bag suitable for use in microwave cooking is constructed of an elongated tube of flexible material closed at one end by a cold seal closure and having a heat seal adhesive deposit applied to the other end thereof for use in closing the bag after filling thereof to form a package. In another embodiment, a package suitable for use in microwave cooking is constructed of an elongated tube of flexible material closed at one end by a cold seal closure and having a cold seal adhesive deposit applied to the other end thereof for use in closing the bag after filling thereof. Methods for making bags and packages including methods for making rolls from which bags and packages may be made.

20 Claims, 16 Drawing Sheets

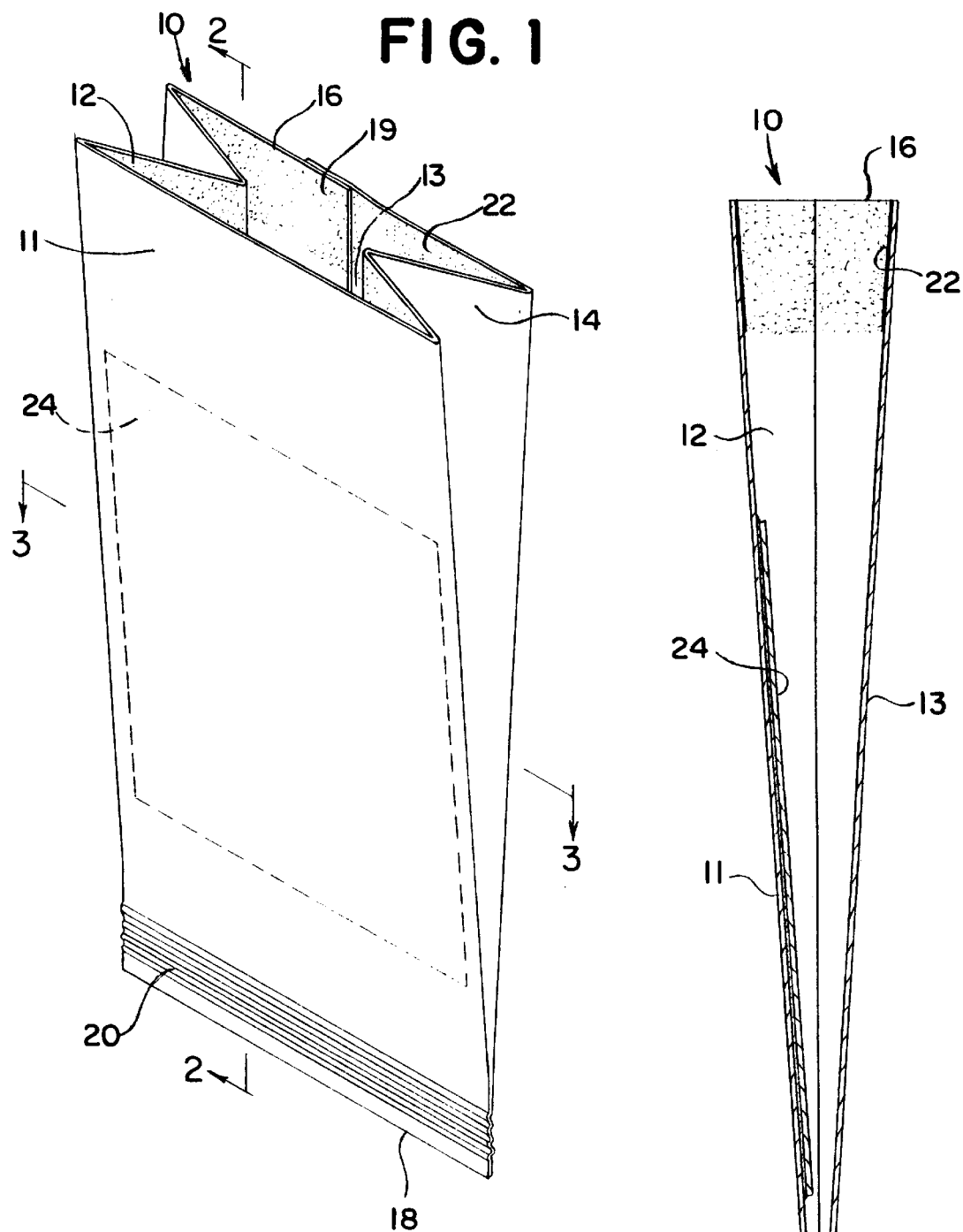

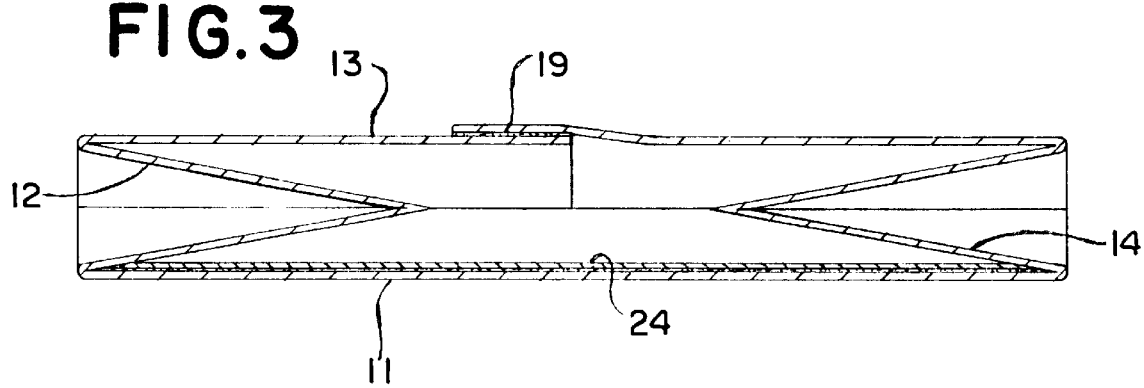
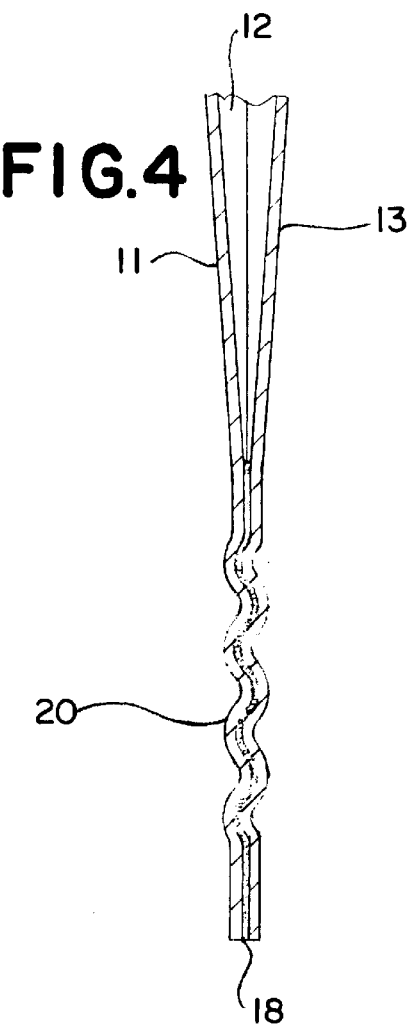

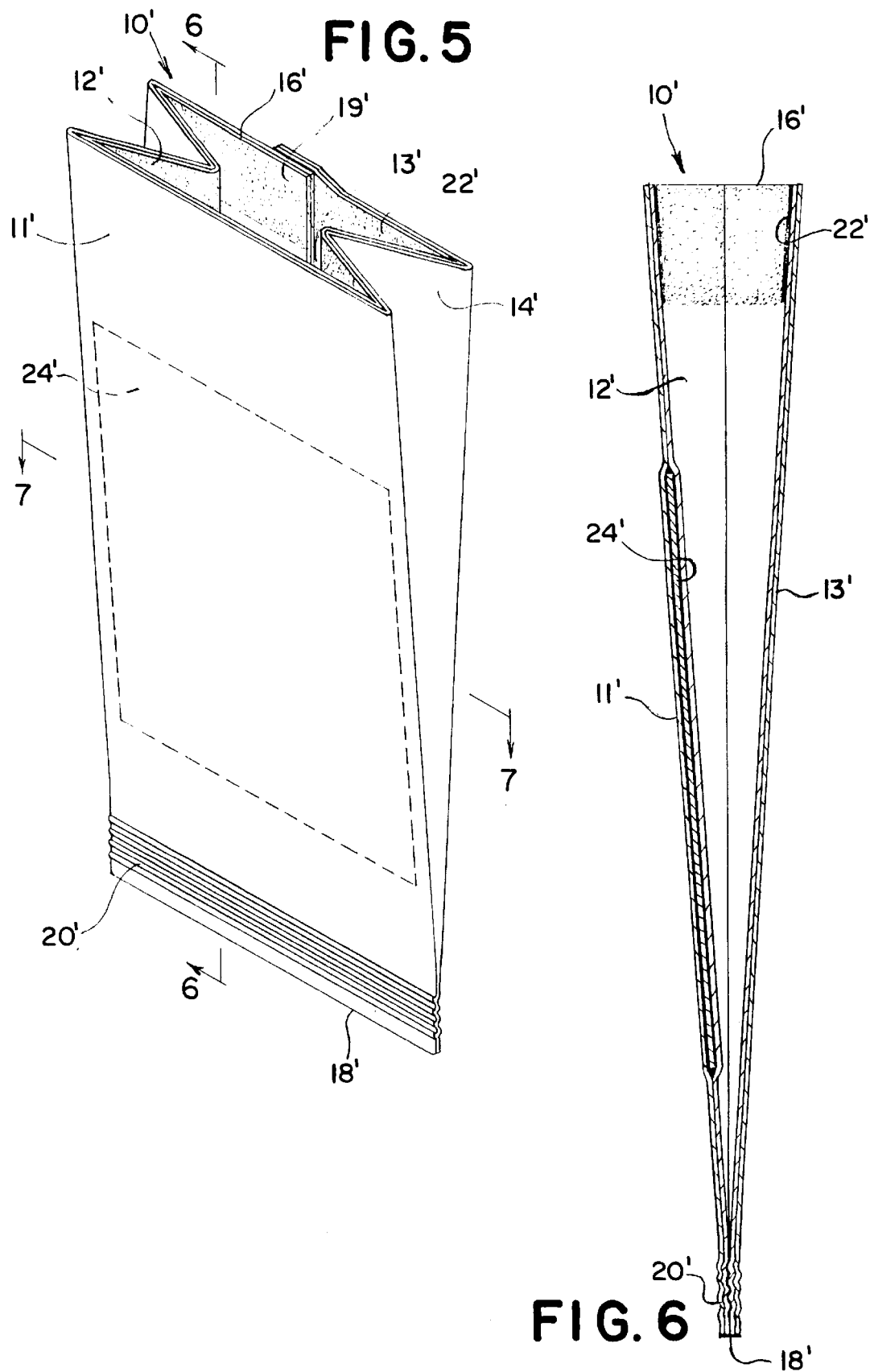

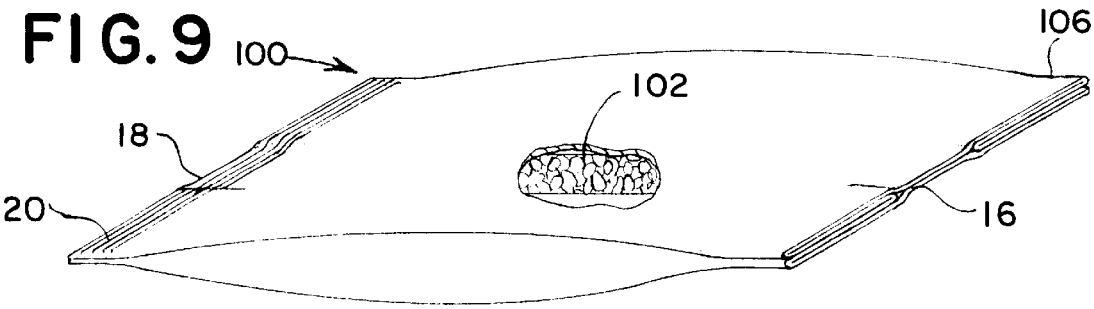
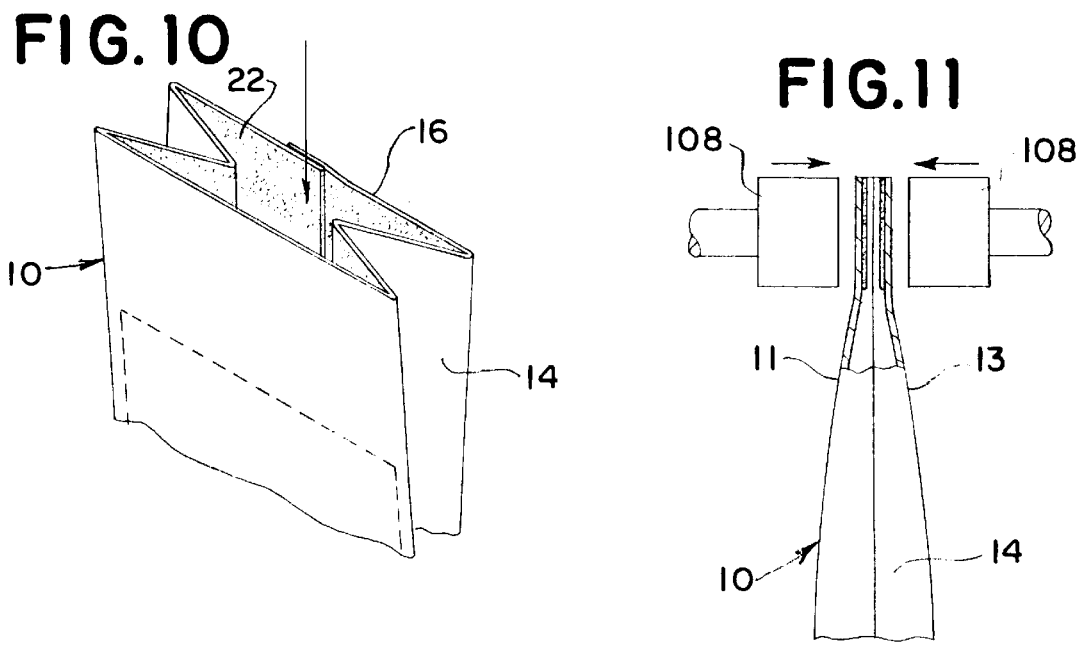
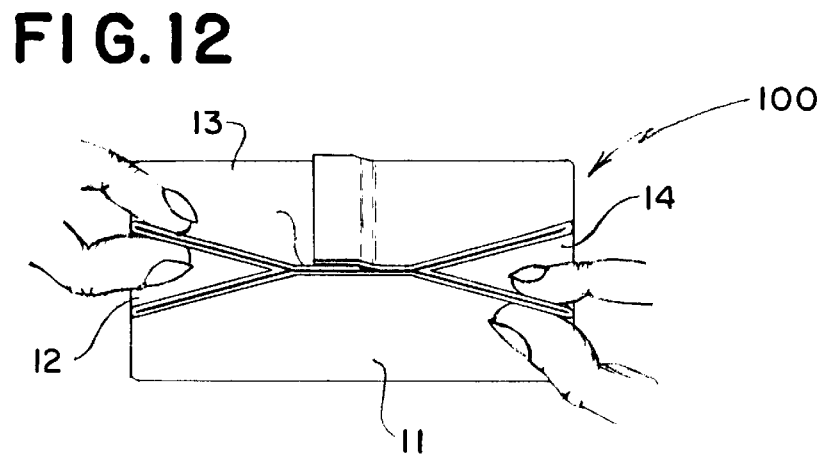

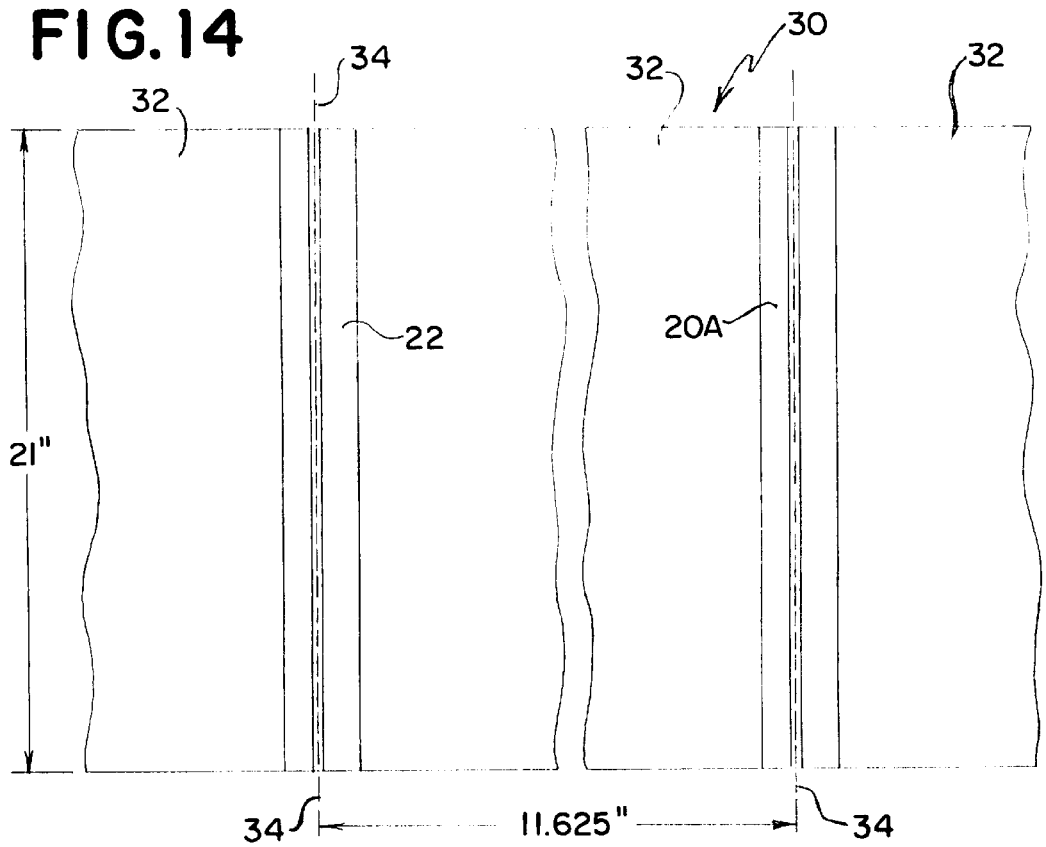
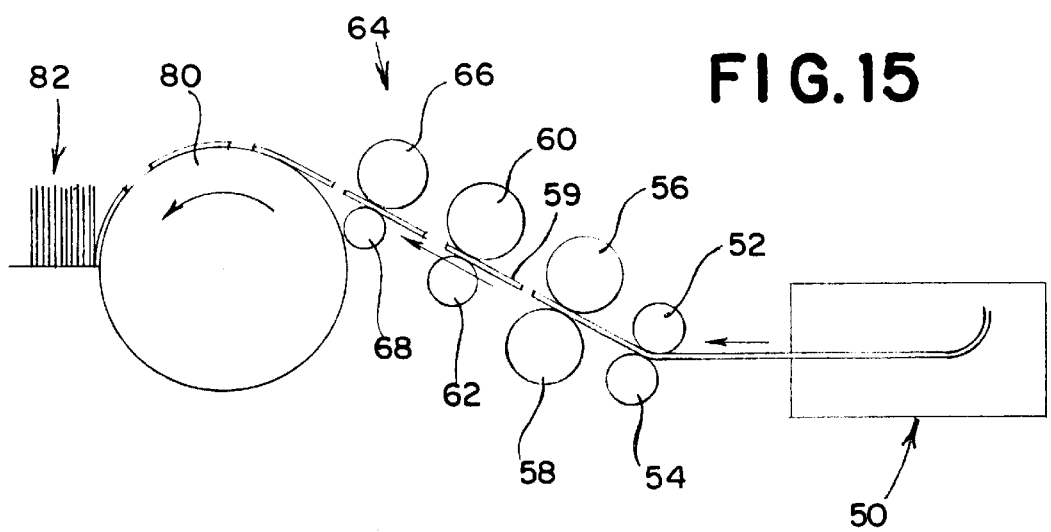

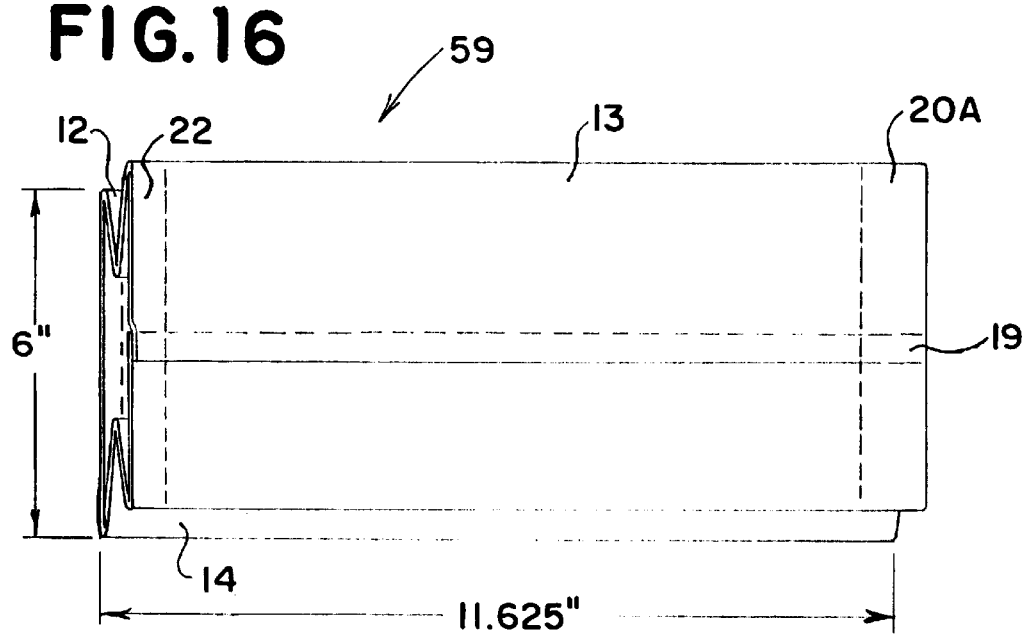
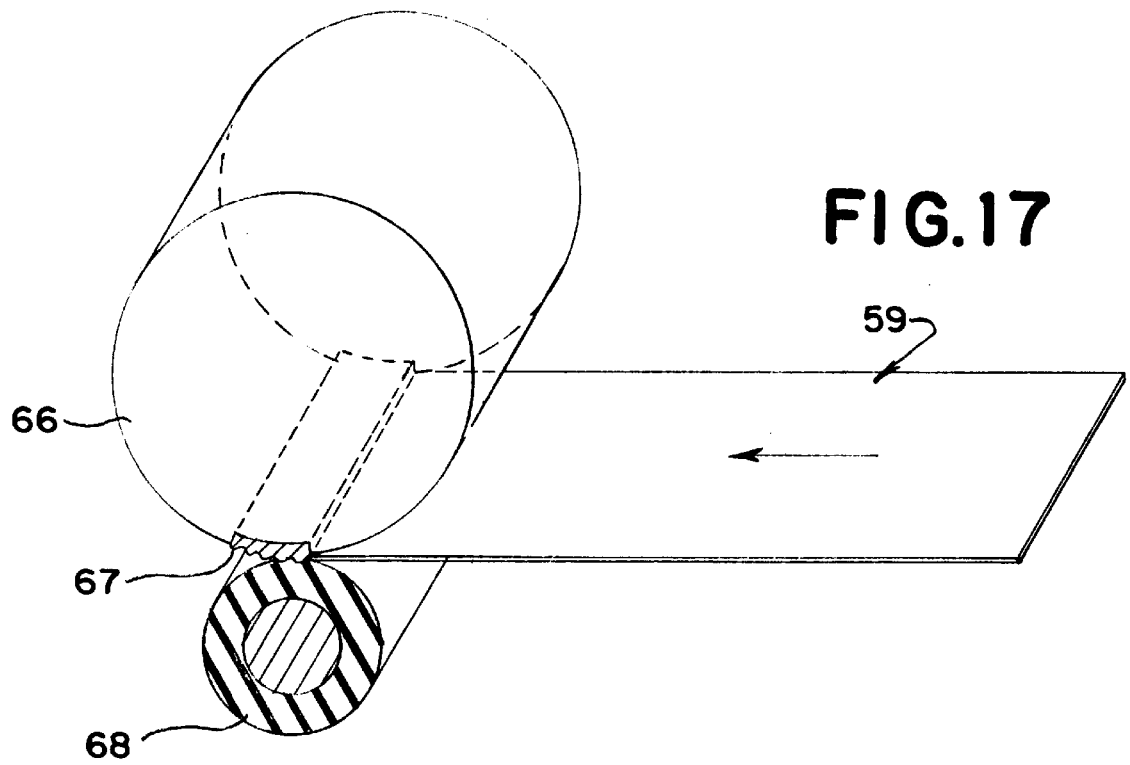

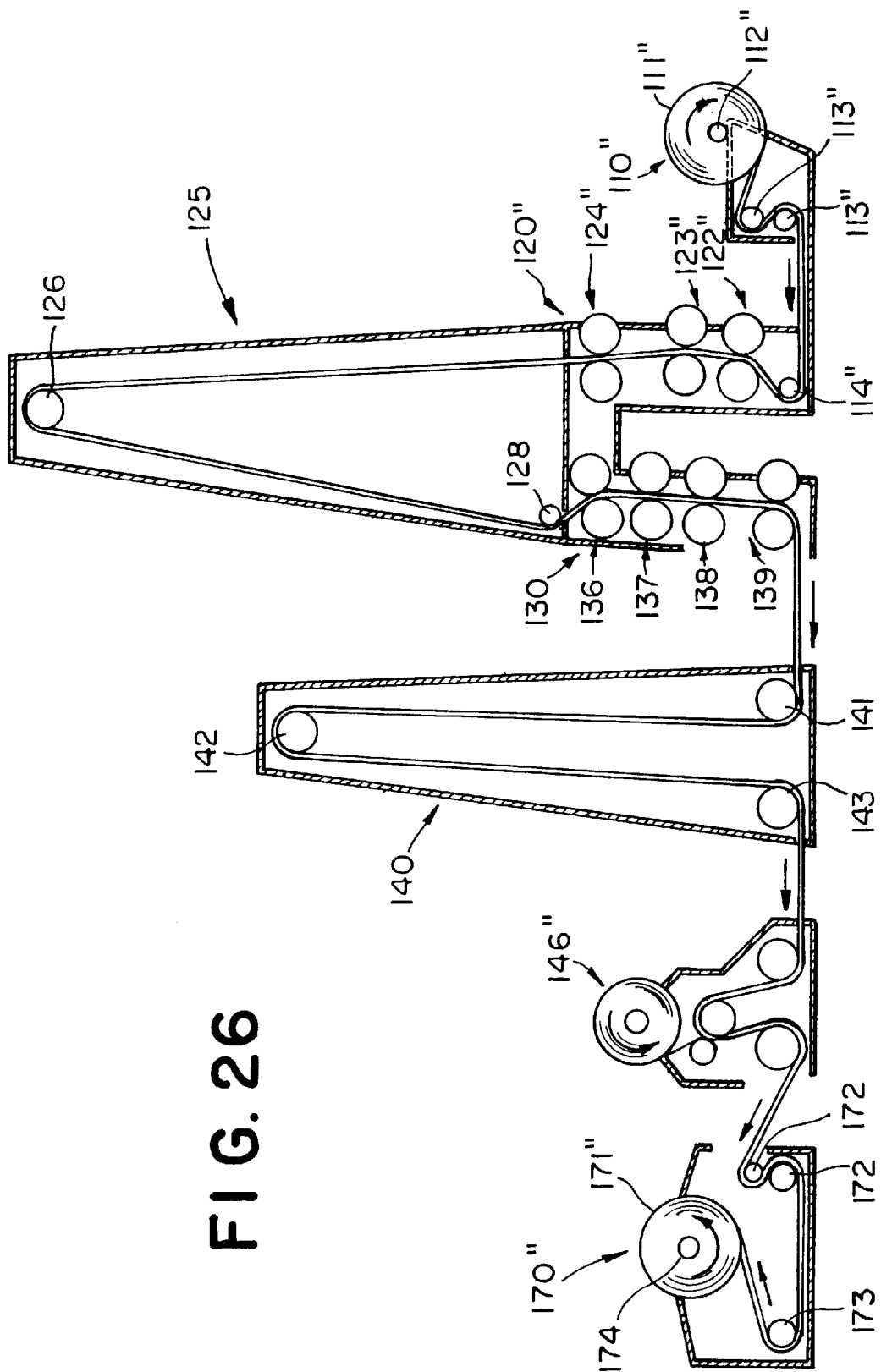

BAG AND METHOD OF MAKING THE SAME

This application is a continuation-in-part of application Ser. No. 08/301,853 filed Sep. 7, 1994, now U.S. Pat. No. 5,814,382, which is a continuation-in-part of application Ser. No. 08/278,919 filed Jul. 22, 1994, now U.S. Pat. No. 5,786,010.

BACKGROUND OF THE INVENTION

1. Field of the Invention

This invention relates to a bag of the type usable in microwave cooking of food products, such as popcorn. The invention also relates to a method of making a bag of the indicated type.

2. Description of the Prior Art

Microwave popcorn bags are well known. Illustrative of bags of this type are those disclosed in U.S. Pat. Nos. 3,691,374; 3,851,574; 3,973,045; 4,461,031; 4,571,337; 4,691,374; 4,892,744; and 5,044,777.

Although bags of the above-indicated types are generally satisfactory, there is a need for improvement thereof in two areas, namely, in the cost of manufacture, and in the use of microwave packages made therefrom. Present day bags of the indicated type are formed into packages containing popcorn kernels, the packages being closed at upper and lower ends thereof by means of heat seals formed by the application of heat and pressure. The use of heat seals to close both ends of the bag is the source of two problems. The first problem is that it is difficult to provide a bag making process which can operate at a high speed because the formation of a heat seal closure requires a considerable dwell time, which extends the length of the production line. Another problem is that heat seal closures are difficult to open after the microwave cooking operation in order to gain access to the cooked product.

Attempts to provide an easily openable popcorn package are disclosed in U.S. Pat. No. 4,571,337, which illustrates in FIGS. 7 and 8 the manner in which the bag is opened by pulling on the diagonally opposite corners at the upper end of a package after the microwave cooking operation is completed. The use of heat seal closure as disclosed in the U.S. Pat. No. 4,571,337, which is illustrative of the prior art, has proved to present problems in the easy opening of the bag. In many applications with the heat sealed closures of the prior art, the closure strength provided by the heat seal is greater than the tear strength of the paper forming the side panels of the bag thereby resulting in torn bags, spilled popcorn, and possible steam exposure to the consumer during the opening of the bag.

SUMMARY OF THE INVENTION

It is an object of the present invention to provide a bag suitable for use in microwave cooking which comprises an elongated tube of flexible material sealed at one end by a cold seal closure and adapted to be sealed at its other end by a heat seal closure.

By reason of the construction in accordance with the invention wherein the bag is made with a cold seal at one end, it is possible to provide a high speed, compact bag making process which does not require the formation of a heat seal during the making of the bag.

In accordance with another feature of the invention, the cold seal closure can be designed to respond to the microwave cooking operation so as to provide a peelable closure which can be opened without tearing the side panels of the bag structure. Moreover, the openability of the cold seal closure is maintained for a longer time period after a cooking operation since it functions at lower temperatures than a comparable heat seal closure.

Another object of the invention is to provide methods of making a bag of the indicated type including the making of a roll comprising a tubular web from which the plurality of said bags can be made.

A further object of the present invention is to provide a package suitable for use in microwave cooking which comprises an elongated tube of flexible material sealed at both ends by a cold seal closure.

By reason of the construction of an embodiment of the invention wherein the package is made with a cold seal at both ends, it is possible to provide a high speed packaging system which does not require the formation of a heat seal at one end during the forming and filing of the package.

A further object of the present invention is to provide a method of making a roll of web material, from which a formed and filled package having a cold seal on both ends may be made.

Yet a further object of the present invention is to provide a method of using a roll of the indicated types to continuously form a bag and to simultaneously fill said bag with unpopped kernels of corn to form a package of the invention.

BRIEF DESCRIPTION OF THE DRAWINGS

FIG. 1 is a perspective view of the microwave popcorn bag pursuant to a first embodiment of the invention.

FIG. 2 is a sectional view taken on line 2—2 of FIG. 1.

FIG. 3 is a sectional view taken on line 3—3 of FIG. 1.

FIG. 4 is a detail view showing the cold seal of the bag shown in FIG. 1.

FIG. 5 is a perspective view of a microwave popcorn bag pursuant to a second embodiment of the invention.

FIG. 6 is a sectional view taken on line 6—6 of FIG. 5.

FIG. 9 is a perspective view showing a package in accordance with the invention.

FIG. 10 is a view showing the first step in the procedure for providing a package made of the bag in accordance with the invention.

FIG. 11 is a view showing a second step in the method of making the package in accordance with the invention illustrating the step of heat sealing the top of the bag to close the same.

FIG. 12 is a view illustrating the procedure used to manually open the heat sealed end of the package after a microwave cooking operation in order to gain access to the contents of the package.

FIG. 14 is a plan view of a part of a web for use in forming a bag in accordance with the invention.

FIG. 15 is a plan view showing part of one work station of the process line shown in FIG. 13.

FIG. 16 is a view showing a tube formed during the process of making a bag in accordance with the invention.

FIG. 17 is a detail view of the mechanism for forming the cold seal at one end of the bag in accordance with the invention.

FIG. 26 is a view in side elevation, partly in diagrammatic form, showing a manufacturing process line for making a roll of continuous web from which packages in accordance with an embodiment of the invention may be made.

DETAILED DESCRIPTION OF THE PREFERRED EMBODIMENTS

Figure 7:
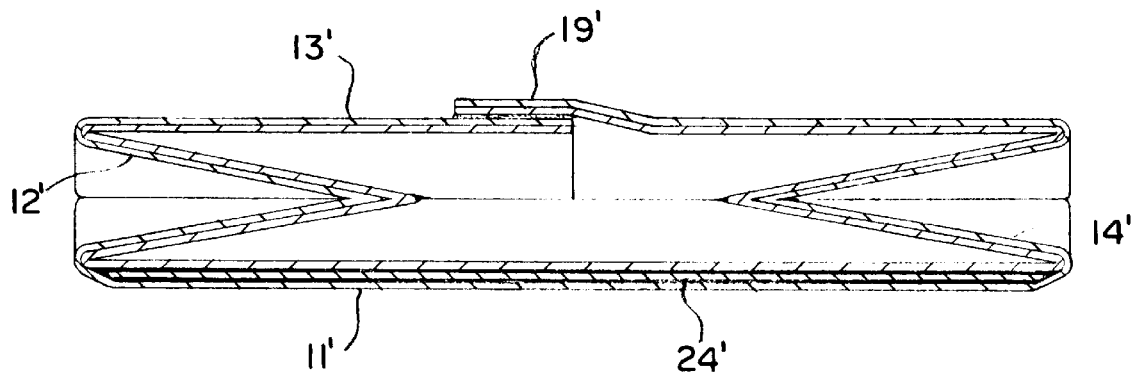
FIG. 7 is a sectional view taken on line 7—7 of FIG. 5.
Figure 8:
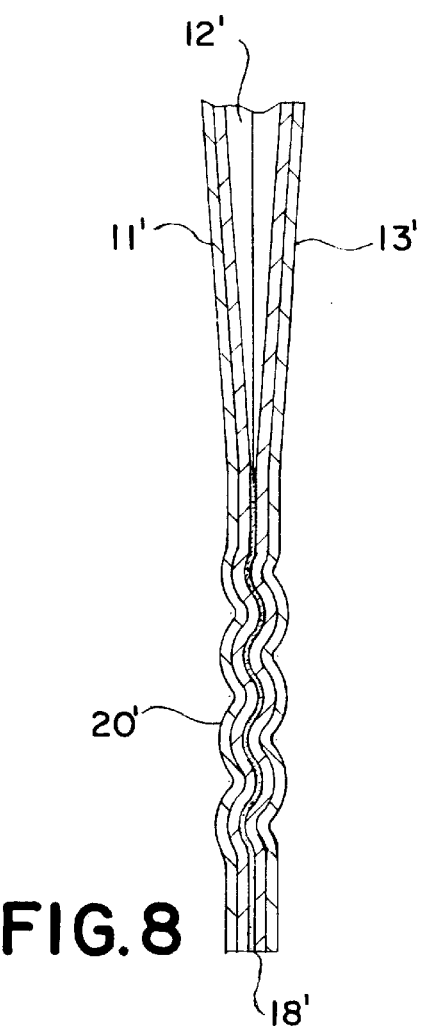
FIG. 8 is a detail view showing the cold seal of the bag shown in FIG. 5.

In FIGS. 1 to 4, there is shown a bag 10 in accordance with the invention suitable for use as a microwave popcorn bag. Bag 10 has a conventional pinch bottom bag construction comprising a tubular construction including a pair of opposed rectangular side panels 11 and 13 joined by a pair of opposed inwardly-folded gusseted side panels 12 and 14, all of which extend between and define an open end 16 and a sealed closed end 18 of the tubular construction shown. Bag 10 is made of a single-ply of flexible material, such as, for example, a grease-resistant paper of approximately 25–35 pounds per ream of a type well known in the art.

The tube forming the bag 10 is sealed along a longitudinal seam 19 by means of an aqueous adhesive as is conventional in the art.

The closed end 18 is sealed by a cold seal closure 20 in accordance with the invention. The term "cold seal" (also referred to in the art as "cohesive seal") is used in the art, and hereinafter, to define a seal or bond formed by an adhesive which exhibits an affinity for itself, whereby when two separate surfaces having said adhesive thereon are brought together under pressure, they exhibit a strong tendency to stick to each other. The "cold seal" or "cohesive seal" in accordance with the invention is formed by an adhesive which provides "a fiber tearing" or "destruct" bond on the paper material, without the aid of heat or dwell time (as is required in typical heat seal), when brought together under pressure only. The adhesive deposited to produce the cold seal closure 20 is a cohesive with a good adhesion to paper substrates and having a heat resistance in a microwave application, an example of which is a cold seal cohesive available from VALLEY ADHESIVES and COATING CORPORATION of Appleton, Wis. and sold under the tradename "Instabond" and designated as product C-2179-A. More specifically, this cohesive is a natural latex cohesive having a density of approximately 8.3 lbs/gal.

By way of example, the cold seal adhesive is applied in a pattern comprising a three-quarter inch wide band extending around the inner surface of panels 11–14 at the end 18 of the bag 10 shown in FIG. 1 at a dry coating weight of two to four pounds per ream, with bag 10 being 6.0 inches and 11.625 inches long.

The cold seal closure 20 is constructed and arranged to provide a bond which at ambient temperature cannot be opened without tearing the paper material, but which at an elevated temperature, such as that produced on the closure 20 by a microwave cooking operation, will be softened to form a "peelable" closure that can be opened easily without tearing the paper material by the manual application of a separating force which pulls side panels 11–14 apart. The term "peelable" as used in the art, and herein, is defined as the property whereby two plies of adhered material can be separated with failure occurring in the adhesive and not in the surface of the plies. Thus, cold seal closure 20 is made to withstand the rigors of microwave cooking and provide the "easy open" operation described above.

At the open end 16 of bag 10, there is provided a deposit of a heat seal adhesive 22 for use in closing this end of the bag 10 after the bag 10 is filled with popcorn kernels, and oil usually, by the packager. The heat seal adhesive 22 is applied in a pattern comprising a band extending around the inner surface of the panels 11 to 14. In the example of a 6×11.625 inch bag described above, the band of heat seal adhesive 22 has a width of approximately 1.375 inches. The application and arrangement of heat seal adhesive 22 is pursuant to present day practice. In accordance with the invention, the deposit of heat seal adhesive 22 is adapted to form a heat seal closure that forms a bond that is stronger (i.e., can better withstand the force therein caused by expanded gases produced within the bag 20 during cooking) than the bond formed by cold seal closure 20 at the elevated temperatures produced by a microwave cooking operation for which bag 10 is made. Moreover, the cold seal closure in accordance with the invention is particularly suited to being constructed and arranged to provide controlled venting whereby the package is vented at the end having the cold seal closure at a desired stage of the microwave cooking. This obviates a problem with the prior art packages having heat seal closures at both ends wherein the desired venting fails to occur thereby resulting in a poorly cooked product.

Side panel 11 is provided with a susceptor 24 formed of a paper/metalized polyester film laminate. It will be apparent that a wide variety of metals and polyester films can be used to produce susceptor 24. Susceptors are well known in the art and, generally, the preferred polyester film is PET (polyethylene terephthalate) and the metal is preferably aluminum. Susceptor 24 is a rectangular patch attached to the material forming bag 10 during the bag making process. Instead of providing a patch, it is also known in the art to print a susceptor material on the paper layer or on another laminating material.

The microwave popcorn bag 10 shown in FIGS. 1 and 2 is very economical to manufacture and can be formed into a popcorn package which is very easy and effective to use. Thus, bag 10 is closed at its one end 18 by the cold seal closure 20 described above and is open at its other end 16 which is used for filling the enclosed space within bag 10 located between the side panels 11–14. After filling the bag 10 with the desired amount of popcorn kernels, the end 16 is sealed in a conventional heat sealing procedure by applying heat and pressure to this end of the bag 10 to provide a heat sealed closure along the band of adhesive 22 as is conventional in the art. It is also common practice to tack the gusseted panels 12 and 14 together at end 16 by the use of heat seal adhesive applied to the opposing exterior surfaces thereof as is conventional in the art.

The bag 10 is also easy to use because the cold seal closure 20 is designed to form a peelable closure that, upon the application thereto of heat from a microwave cooking operation, can be opened easily without tearing by the manual application of a separating force which pulls the side panels 11 and 14 apart. This opening procedure is conventional in the art and is disclosed in the above-discussed patents. However, the novel cold seal closure 20 in accordance with the invention provides better results and permits the use of lighter weight microwaveable bag structures, such as the single ply material for bag 10.

In FIGS. 5 to 8, there is shown a microwave popcorn bag 10' which is essentially the same as the bag 10 shown in FIGS. 1 to 4, wherefore, corresponding parts are given the same reference numerals with primes added.

Bag 10' is the same size as bag 10 and also suitable for use as a microwave popcorn bag. Bag 10' has a conventional pinch bottom bag construction comprising a tubular construction including a pair of opposed inwardly-folded gusseted side panels 12' and 14', all of which extend between and define an open end 16' and a sealed closed end 18' of the tubular construction shown. Bag 10' is made of two-ply flexible material, such as, for example, an inner ply of grease-proof paper of approximately 20–25 pounds per ream and outer ply of bleached or natural kraft paper of approximately 20–25 pounds per ream, said two-ply material being well known in the art.

The tube forming the bag 10' is sealed along a longitudinal seam 19' by means of an aqueous adhesive seal as is conventional in the art. The closed end 18' is sealed by a cold seal closure 20' such as cold seal 20 described above except that cold seal 20' is applied to the inner surface of the inner ply of the two-ply material used to make bag 10'.

At the open end 16' of bag 10', there is provided a deposit of a heat seal adhesive 22' for use in closing this end of the bag after the bag 10' is filled with popcorn kernels. The heat seal adhesive 22' is located at a band extending around the inner surface of the inner ply of the panels 11' to 14' and is the same as heat seal adhesive 22 described above.

Side panel 11' is provided with a susceptor 24' formed of a metalized polyester film as is conventional in the art. It will be apparent that a wide variety of metals and polyester films can be used to produce susceptor 24'. Susceptors are well known in the art and generally the preferred polyester film in PET (polyethylene terephthalate) and the metal is preferably aluminum. Susceptor 24' is a rectangular patch located on side panel 11' between the plies of the material forming bag 10' and is inserted in position during the bag making process as is conventional in the art.

The microwave popcorn bag 10' shown in FIGS. 5 to 8 is very economical to manufacture and can be formed into a popcorn package which is very easy and effective to use. Thus, bag 10' is closed at its one end 18' by the cold seal closure 20' described above and is open at its other end 16' for use in filling the enclosed space within bag 10' located between the side panels 11'–14'. After filling the bag 10' with popcorn kernels and oil, the end 16' is sealed in a conventional heat sealing procedure by applying heat and pressure to this end of the bag 10' to provide a heat sealed closure as is conventional in the art.

The bag 10' is also easy to use because the cold seal closure 20' is designed to form a peelable closure that, upon the application thereto of heat from a microwave cooking operation, can be opened easily without tearing by the manual application of a separating force which pulls the side panels 11'–14' apart as is conventional in the art and as is disclosed in the above-discussed patents.

FIG. 9 shows a microwave popcorn package 100 manufactured from a bag 10 in accordance with the invention. The bags 10 are shipped to a packager who completes the making of the package. Package 100 contains a quantity of unpopped kernels of corn 102 and has the end 16 of bag 10 sealed by a conventional heat seal closure 106. The filling of the bag 10 with a quantity of popcorn kernels is done through the open end 16 as shown in FIG. 10 after which this end 16 is closed by conventional heat sealing procedure illustrated in FIG. 11. As shown in FIG. 11, a pair of sealing jaws 108, at least one of which is heated, are pressed together across the upper ends of side panels 11 and 13 in the area of the heat seal adhesive deposit 22. As the jaws 108 are pressed together for a set dwell time under conditions of heat and pressure, a desired heat seal closure 106 is formed at the end 16 of bag 10.

FIG. 12 illustrates the procedure for opening a package 100 after the completion of a microwave cooking operation. It will be apparent that during the microwave cooking operation, the contents of the package 100, as well as the sealed closures 20 and 106, are heated, and the increased pressure of the gases within the package 100 cause it to expand a certain amount due to the generation of water vapor from the popping corn kernels. This applies pressure to the sealed closures 20 and 106, which, if desired can be designated to provide for venting as is well known in the art. The cold seal closure 20 is particularly suitable for the design of controlled venting as desired.

After the microwave cooking operation is completed, the popped corn is removed from the package 100 by manually opening the end 18 of the bag as illustrated in FIG. 12. The consumer is instructed on the package 100 to open the bag 10 carefully by pulling the top diagonal corners while avoiding contact with escaping steam. As discussed above, the novel cold seal closure 20 in accordance with the invention is constructed and arranged to provide a peelable closure when the bag 10 has its temperature elevated as a result of the microwave cooking operation for which it is made. What occurs is that the cold seal closure 20 becomes softened when exposed to the heat produced to thereby form a peelable closure that can be opened easily, without tearing the paper material providing the side panels 11–14, by the manual application of the separating force (as illustrated in FIG. 12) which pulls side panels 11–14 apart. It will be noted that the heat seal closure 106 is constructed and arranged so that it requires a higher separating force to open the same than the force required to open the cold seal closure 20 during and on completion of the microwave cooking operation. Moreover, as discussed above, the cold seal closure 20 can readily provide controlled venting and obviate the problems of non-venting that can occur in packages with heat seal closures at both ends.

A method of making a bag in accordance with the invention is shown in FIGS. 13 to 17. An initial step in the method is to provide a web 30 of flexible material for use in forming a tube, said web of material having a plurality of successive web lengths 32 of equal size much as that shown in FIG. 14 wherein part of a flat web 30 is illustrated. Each web length 32 has a first deposit 20A of a cold seal adhesive suitable for forming the cold seal closure 20 at its one end and a second deposit 22 of a heat seal adhesive suitable for forming the heat seal closure 106 of package 100 (as described above) at its other end. Deposits 20A and 22 extend transversely across each web length 32 at the ends thereof as shown in FIG. 14. Each web length 32 extends between the two transversely extending cut-off lines indicated at 34 in FIG. 14 and located adjacent to and outwardly of adhesive deposits 20A and 22. In order to make a bag 10 of the 6.0×11.625 inch size described above, each web length 32 is 21.0 inches wide and 11.625 inches long.

After web 30 has adhesive deposits 20A and 22 applied thereto (which is typically done by a printing operation), it is wound into a large coil and delivered to the bag making machine. In the case of bag 10, the adhesive deposits are applied to a web used to provide the single ply from which bag 10 is made. In the case of bag 10' the adhesive deposits are applied to a web used to provide the inner ply of the two-ply material from which bag 10' is made.

Figure 13:
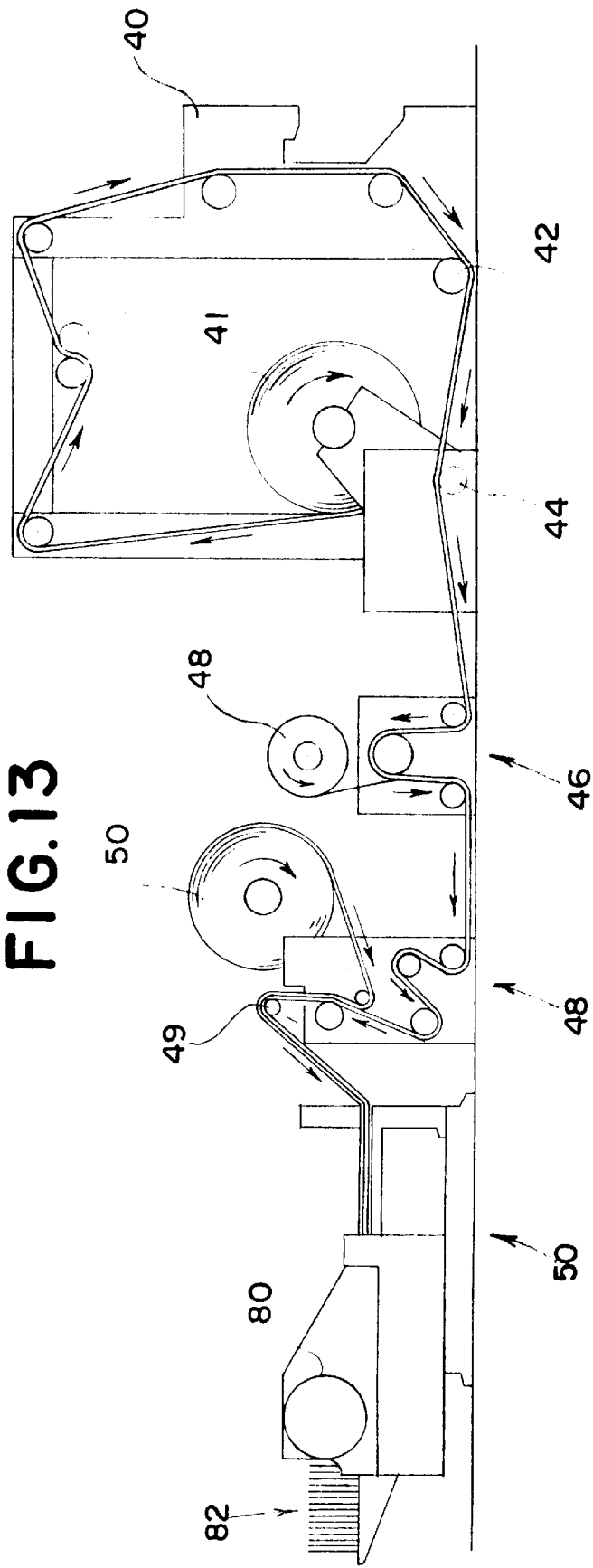
FIG. 13 is a side elevation, partly in diagrammatic form, showing a manufacturing process line for making a bag in accordance with the invention.

In FIG. 13, there is shown a production line for making a pinch bottom bag such as the bag 10' shown in FIGS. 5 to 8. In FIG. 13, arrows are used to show the direction of movement of the webs through the bag making the machine shown therein. At its input end at the right end of FIG. 13, there is provided a flexographic printing press 40 which has the outer ply of the two-ply bag material fed therethrough from a coil 41 thereof (as shown by the arrows in FIG. 13) so that the desired ink printing is applied on the side of the outer ply which will be formed into the outer surfaces of the bag 10'. This printing press arrangement is conventional in the art.

The outer ply is fed from the press 40 across idler rolls 42 and 44 to a work station 46 whereat the susceptor patch is applied to the inner surface of the outer ply from a coil 48' thereof by a construction that is conventional in the art. The outer ply with the susceptor patch applied thereto is then passed through a work station 48 whereat the liner, or inner ply of the two-ply bag material, is laminated onto the inner side of the outer ply by an arrangement conventional in the art. Also at the work station 48, the seam adhesive for forming the longitudinal seam 19 is applied by glue applicating roller indicated at 49. The liner is supplied from a pre-printed coil 50' which has the cold seal adhesive deposit 20A and heat seal adhesive deposit 22 pre-applied thereto in the arrangement of web lengths 32 as shown in FIG. 14.

The two-ply web with the seam adhesive thereon and the susceptor patches located between the plies is then fed from the work station 48 to a tube forming machine 50. The tube forming machine 50 is conventional and is constructed and arranged for the forming of a tube from a flat web by means of a conventional former plate arrangement. Because of the tackiness of the cold seal adhesive deposit 20A, a "Teflon" former is used, which reduces friction between the adhesive and the former plate. The conventional forming machine 50 operates by forming a tube-shaped web between a pair of cooperating draw rollers 52 and 54 (FIG. 15) to a pair of cut-off rollers 56 and 58 which cut this web along the transverse cut-off lines 34 to form tube lengths 59 as shown in FIG. 16.

From the cut-off rollers 56 and 58, a formed and cut-off tube length 59 is fed by a pair of transfer rolls 60 and 62 to a work station 64 shown in FIG. 17 whereat the cold seal closure 20 is formed. As shown in FIG. 15, the tube length 59 passes from the cut-off rollers 56 and 58 and is fed by a pair of transfer rollers 60 and 62 between a pair of rollers 66 and 68 which form the cold seal closure 20 at the end of the tube length 59 by an arrangement shown in detail in FIG. 17. To this end, the lower roller 68 is made of a high durometer rubber and the upper roller comprises a crimp block 67, which is a metal strip extending across the entire width of the tube length and mounted in a recess on the periphery of roller 66. Crimp block 67 has the desire crimp pattern, namely, a plurality of rib-like projections, formed in its outer surface facing lower roller 68. The position of the rollers 66 and 68 are controlled by an air regulated system to ensure that a consistent pressure (such as produced by pressure setting of 50–90 PSI) is applied to the end of the tube length 59 passing therebetween to pressurize the same in order to form the cold seal closure 20 in accordance with the invention.

The completed bag 10', which comprises a tube with the cold seal closure 20 formed at its one end, is then fed around a drum 80 and stored in a collector area 82 for pick-up.

The production line shown in FIG. 13 is essentially conventional except for the portion thereof whereat the formed tube 59 is fed to the cold sealing station 64. As is apparent from the consideration of the drawings, the production line is very compact and is arranged in a straight line whereby it can be constructed to operate at very high speeds. In prior comparable pinch bottom production lines, the length of the line required to produce the conventional heat seal closure at one of the pinch bottom bag is much longer than that of the cold seal station 64 shown in FIG. 13 and requires a considerable dwell time to perform the heat seal closure step.

A method of making a bag 10 as shown in FIGS. 1 to 4 is essentially the same that shown in FIGS. 13 to 17, the only difference being that a single ply of material is used and there is no need to combine two plies as described in the method described above. In this case, a coil of the single ply material having the cold seal adhesive deposit 20A and heat seal adhesive deposit 22 pre-applied thereto is mounted in the press 40 at the same location as the coil 41 for the outer ply and a liner coil 50' is not necessary.

Figure 18:
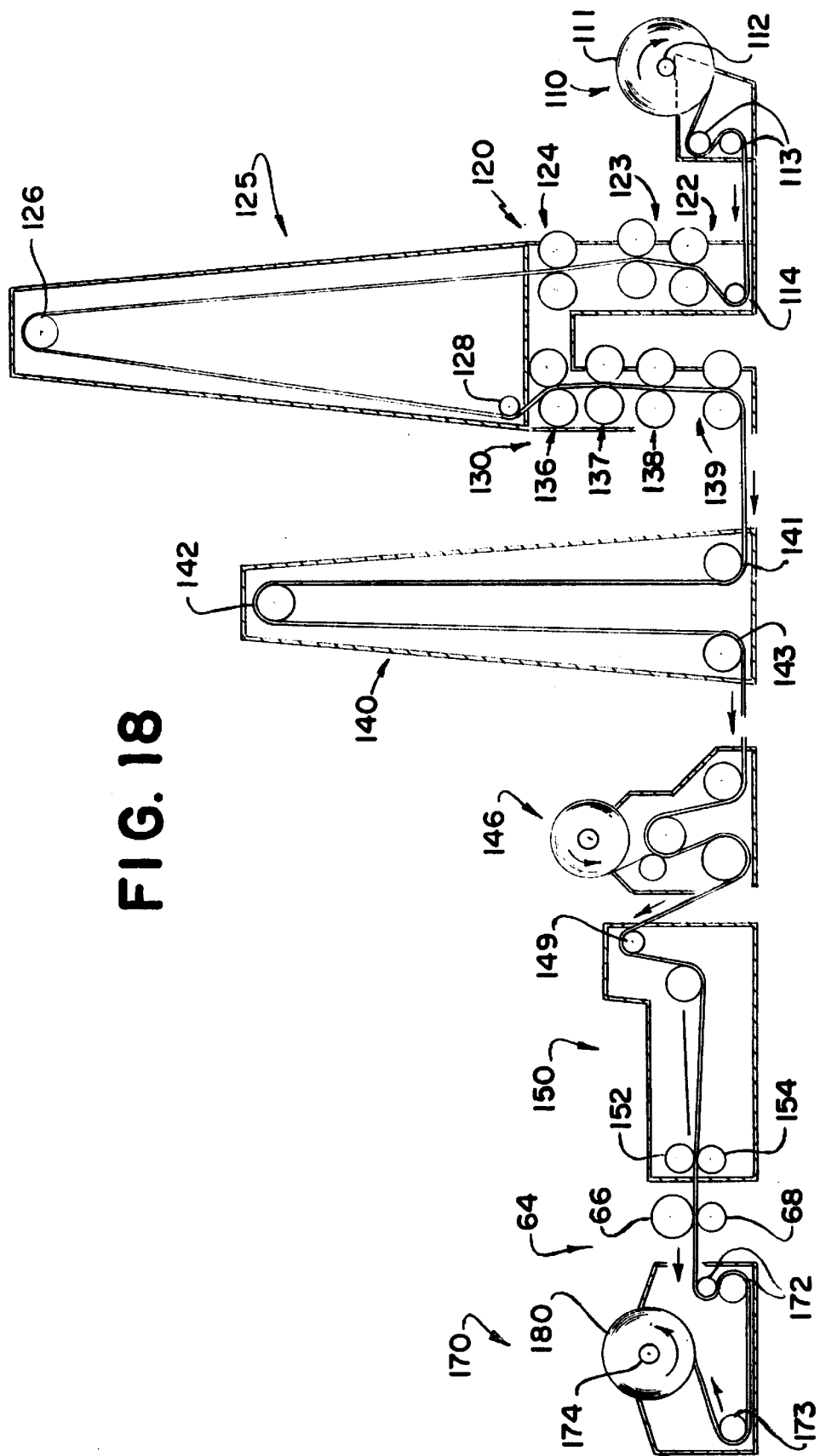
FIG. 18 is a side elevation, partly in diagrammatic form, showing a manufacturing process line for making a tubular roll from which bags in accordance with the invention can be made.

In FIG. 18, there is shown a production line for making a continuous tubular web comprised of a plurality of tube lengths which can be made into a pinch bottom bag 10, said web being wound into a roll from which a plurality of said bags 10 can be cut in a subsequent package forming operation wherein a package such as that shown hereinbefore can be made.

The production line shown in FIG. 18 comprises an unwind station 110 which includes a roll 111 of a single ply material of the type described above for making the bag 10, said roll 111 being mounted on a spool 112 with the web being fed from the roll 111 around a pair of dancer rollers 113 which feed the web around a roller 114 at the entry of a printing station 120 comprising three pairs of rollers 122, 123, and 124. The pairs of rollers 122 and 123 are constructed and arranged to print onto the web passing therethrough the strips of the adhesive deposits 20A and 22, respectively, which are arranged as shown in FIG. 14. Thus, as the web is fed upwardly from the rollers 124 to leave the printing station 120, the web is in the condition such as that shown in FIG. 14 wherein part of a flat web 30 is illustrated. Thus, each web length 32 has a first deposit 20A of a cold seal adhesive suitable for forming the cold seal closure 20 at its one end and a second deposit 22 of a heat seal adhesive suitable for forming the heat seal closure, such as the heat seal closure 106 of package 100 (as described above), at its other end. Deposits 20A and 22 extend transversely across each web length 32 at the ends thereof with each length 32 extending between two transversely extending spaced apart cut-off lines indicated at 34 and located adjacent to and outwardly of adhesive deposits 20A and 22 as shown in FIG. 14.

From printing station 120, the web moves upwardly into a drying tunnel 125, and passes around a roller 126 and back downwardly to an exit roller 128 at the lower end of the drying tunnel 125. As the web passes through the drying tunnel 125, heat is applied thereto to dry the adhesive deposits 20A and 22 applied at the printing station 120.

The web is fed from the roller 128 of drying tunnel 125 downwardly into a second printing station 130 which applies the graphics to the web surface which is to become the outer surface of the formed bag. The printing station 130 shown in FIG. 18 comprises four pairs of printing rollers 136, 137, 138, and 139, three of which are used for the application of colors to produce the desired graphics and one of which is used for the application of a heat seal adhesive for tacking the gusseted panels together at the heat seal end of the bag.

From the second printing station 130, the web is fed to a second drying tunnel 140 and passes sequentially around lower roller 141, upper roller 142, and lower roller 143. As the web passes through the second drying tunnel 140, heat is applied thereto to dry the ink providing the colors printed thereon and the heat seal adhesive for the gussets.

From the second drying tunnel 140, the web is fed to a patching station 146 which is essentially the same as patching station 46 described above with respect to the production line shown in FIG. 13. At the patching station 146, a susceptor patch is applied to the inner surface of the web and the web with the susceptor patch applied thereto is fed to a roller 149 at the inlet of a tube forming machine 150 which is essentially the same as the forming machine 50 described above with respect to the production line shown in FIG. 13. At the entry roller 149, the seam adhesive for forming the longitudinal seam 19 is applied by a glue applicating roller. From this roller 149, the web is fed into the tube forming machine 150 which forms a continuous tube from a flat web by means of a conventional former plate arrangement. Forming machine 150 forms a tube around former plates and then passes the tub-shaped web between a pair of rollers 152 and 154 to the next work station indicated at 64'.

Figure 19:
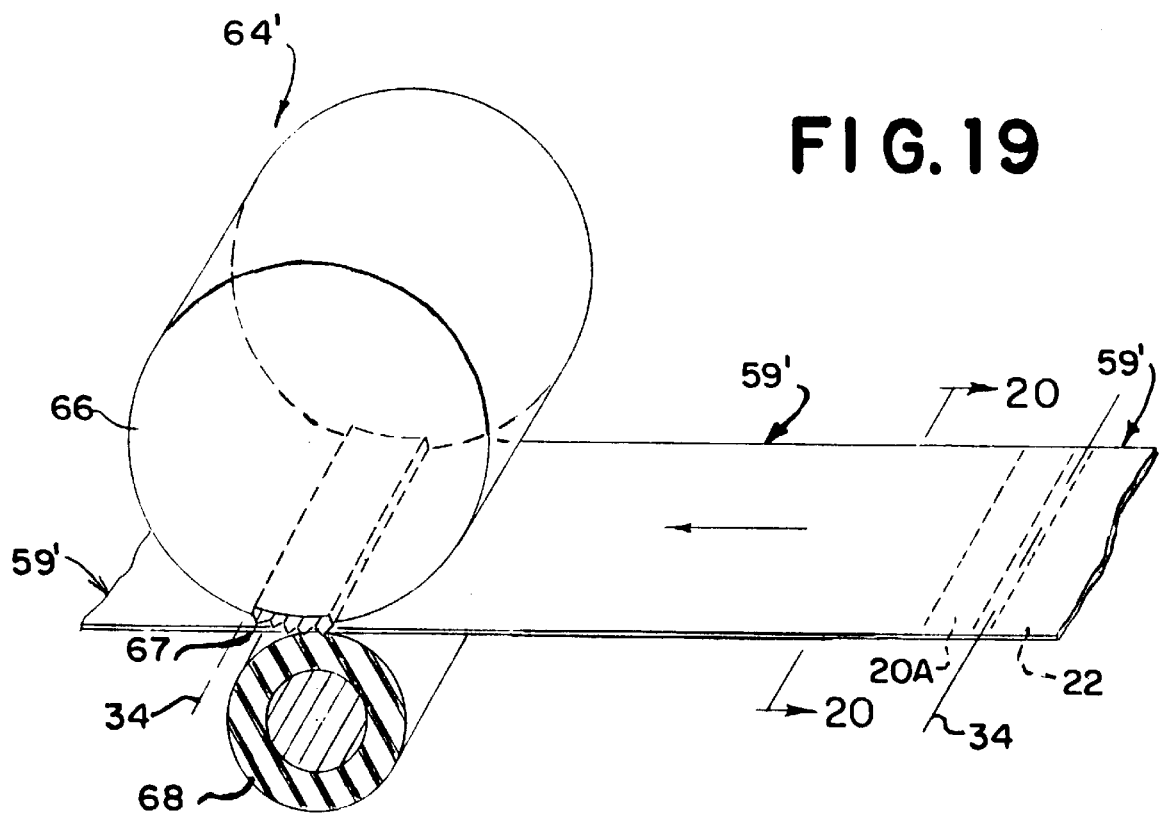
FIG. 19 is a detail view of the mechanism employed in the process line shown in FIG. 18 for forming the cold seal at one end of the bag in accordance with the invention.
Figure 20:
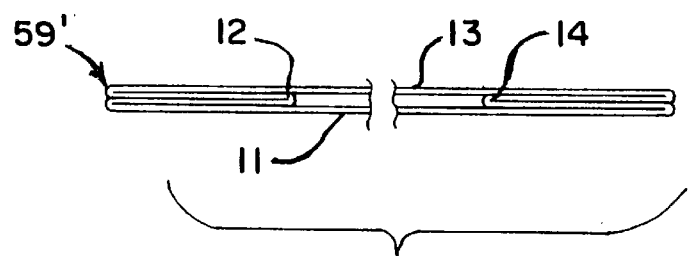
FIG. 20 is a sectional view taken on line 20—20 of FIG. 19.

As shown in FIGS. 19 and 20, the tube formed by the forming machine 150 comprises a pair of opposed flat sides, such as sides 11 and 13 of the bag 10, and pair of opposed intucked sides, such as the sides 12 and 14 of the bag 10.

From this point whereat the tubular web is fed from the former 150, the production line shown in FIG. 18 differs from that shown in FIG. 13 in that the tubular web is not cut into a plurality of separated tube lengths, but, instead, is fed directly to a work station 64' comprising the pair of rollers 66 and 68 as shown in FIG. 17 and described in detail above. Thus, rollers 66 and 68 are operable to form the cold seal closure 20 at the end of the successive continuous tube lengths indicated at 59' in FIG. 19, The station shown at 64' is shown in detail in FIG. 19 and comprises a lower roller 68 made of a high durometer rubber and an upper roller 66 comprising a crimp block 67, rollers 68 and 66 being described in detail above with respect to FIG. 17. The work station 64' is essentially the same as work station 64 shown in FIG. 17, the only difference being that the web passing the rollers 66 and 68 is a continuous tubular web comprising successive tube lengths 59' and has not been cut into a plurality of separated tube lengths 59 as is the case in the method shown in FIG. 13.

After the cold seal closure 20 is formed at station 64', the continuous tubular web is passed around a pair of entry rollers 172 of a rewind station 170. From the two entry rollers 172, the tubular web is fed around an idler roller 173 and wound onto a spool 174 into a roll 180. It will be apparent that the roll comprises a continuous tubular web wound into a rolled configuration and comprising a plurality of successive tube lengths 59' from which a plurality of bags 10 can be made by simply cutting off the web along the cut-off lines 34 between the locations whereat the heat seal and cold seal adhesives 22 and 20A, respectively, are applied.

The roll 180 formed by the production line shown in FIG. 18 can be removed from the rewind station 170 and shipped to the packager whereat it can be placed in a package filling production line whereat the tube lengths 59' are cut into bags as they are fed from the roll 180, whereupon the bags 10 can be filled and closed at the heat seal end to provide a package such as that shown and described above.

Figure 21:
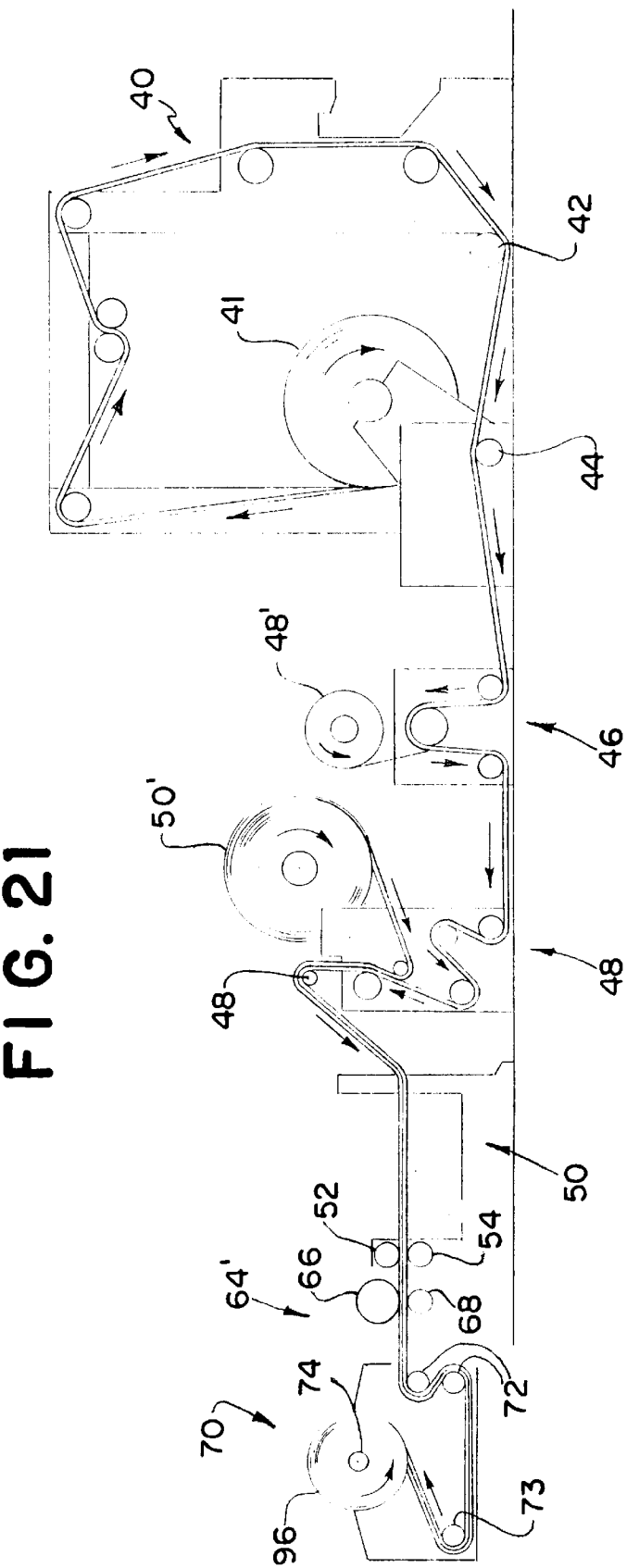
FIG. 21 is a side elevation, partly in diagrammatic form, showing another manufacturing process line for making a tubular roll from which bags in accordance with the invention can be made.

In FIG. 21, there is shown a production line for making a continuous tubular web comprised of a plurality of tube lengths which can be made into a pinch bottom bag 10', said web being wound into a roll 96 from which a plurality of said bags 10 can be cut in a subsequent package forming operation wherein a package such as that shown hereinbefore can be made.

The production line shown in FIG. 21 is similar to that shown in FIG. 13 and comprises the same conventional flexographic printing press 40, the same stations 46 and 48, and the same work conventional tubing forming machine 50. Thus, press 40 has the outer ply of the two-ply bag material for making bag 10' fed therethrough from a coil 41 thereof with the desired ink printing applied to the side of the outer ply which will be formed into the outer surface of the bag 10'. The outer ply is fed from the press 40 across idler rollers 42 and 44 to work station 46 whereat the susceptor patch is applied to the inner surface of outer ply from a coil 48' thereof. Also, at work station 48, the seam adhesive for forming the longitudinal seam 19' is applied by a glue applicating roller indicated at 49 and the liner for the bag 10' is applied from the pre-printed coil 50', which liner has the cold seal adhesive deposit 20A and the heat seal deposit 22 pre-applied thereto in the arrangement of web lengths 32 as shown in FIG. 14. The two-ply web with the seam adhesive thereon and the susceptor patches located between the plies at spaced apart intervals is then fed from the work station 48 to the tube forming machine 50 which forms a continuous tube from a flat web by means of a conventional former plate arrangement. Forming machine 50 forms a tube around former plates and then passes the formed tube-shaped web between a pair of cooperating draw rollers 52 and 54 to the next station indicated at 64'.

From this point whereat the tubular web is fed from the former 50, the production line is shown in FIG. 21 differs from that shown in FIG. 13. In the production line shown in FIG. 21, the tubular web is not cut into a plurality of separated tube lengths but, instead, is fed directly into the work station 64' comprising the pair of rollers 66 and 68 shown being operable to form the cold seal closure 20 at the end of each of successive tube lengths such as indicated at 59' in FIG. 19.

The station shown in 64' is shown in detail in FIG. 19 and comprises a lower roller 68 made of a high durometer rubber and an upper roller comprising a crimp block 67 identical to that described above with respect to FIG. 17. The work station 64' is essentially the same as that shown in FIG. 17, the only differences being that the tubular web passing between the rollers 66 and 68 is a continuous tubular web comprising successive tube lengths 59' and has not been cut into a plurality of separated tube lengths 59 as is the case in the method shown in FIG. 13. As discussed above with respect to the arrangement shown in FIG. 17, the position of the rollers 66 and 68 are controlled by air regulated system to ensure that a consistent pressure is applied to the end of the tube length 59' passing therebetween so as to pressurize the same in order to form the cold seal closure 20 in accordance with the invention.

After the cold seal 20 is formed at station 64', the continuous tubular web is fed to a rewind station 70 whereat the tubular web is fed to a pair of entry rollers 72 and a roller 73 and wound onto a spool 74 into a roll 96. It will be apparent that the roll 96 comprises a continuous tubular web wound onto a roll configuration, said roll 96 comprising a plurality of tube lengths 59' from which a plurality of bags 10' can be made by simply cutting off the tubular web along the cut-off lines 34 between the locations whereat the heat seal and cold seal adhesive 20A and 22, respectively, are applied.

The roll 96 can be shipped to the packager whereat it can be placed in a package filling production line whereat the tube lengths 59' are cut into bags 10' as they are fed from the roll 96 whereupon the bags 10' can be filled and closed at the heat seal end to provide a package such as that shown and described above.

It will be apparent that the production line shown in FIG. 21 can be modified easily to provide a production line for making a roll comprising a continuous tubular web lengths which can be made into a pinch bottom bag 10, the only difference being that a single ply of material is used and there is no need to combine two plies as described in the method shown in FIG. 21. Also, in this case, a coil of single ply material is mounted in the press 40 at the same location as the coil 41 for the outer ply and a liner coil 50' is not necessary.

The main advantage of forming a roll such as the rolls 96 and 180 comprising a continuous web having a plurality of the tube lengths as discussed above is that it eliminates individual bag handling at both the bag making plant and at the plant where the bag is filled to form a package.

Figure 22:
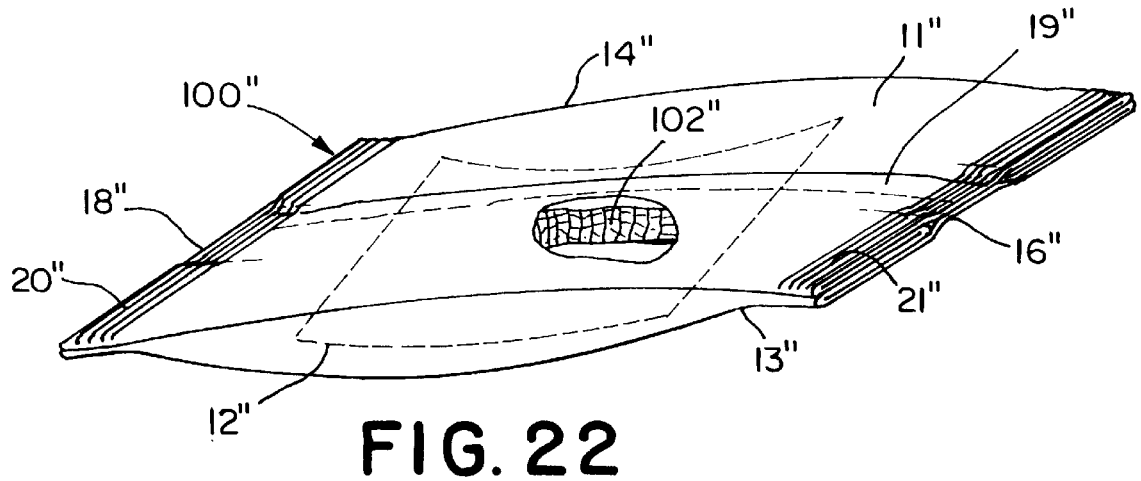
FIG. 22 is a perspective view of a package in accordance with an embodiment of the present invention.

A further embodiment of the present invention comprises yet another package suitable for use in microwave cooking. The package 100" of this embodiment comprises an elongated tube of flexible material sealed at both ends by a cold seal closure and is illustrated in FIG. 22. The package 100" of this embodiment of the invention has a construction similar to the package illustrated in FIG. 9. The package 100" is formed from a tubular web and has a first cold seal closure 20" at a first end 18", a second cold seal closure 21" at a second end 16", and a pair of opposed rectangular side panels 11" and 13" joined by a pair of opposed inwardly-folded gusseted side panels 12" and 14", all of which extend between the first and second cold seal closures as shown in FIG. 22. The material forming the package 100" may be either single-ply or two-ply construction and is sealed along a longitudinal seam 19" by means of an aqueous adhesive as is conventional in the art and described above. Alternatively, the longitudinal seam 19" may be sealed by a cold seal adhesive as described below.

In contrast with the previous embodiment of the invention illustrated in FIG. 9, the package 100" of this embodiment of the invention comprises a deposit of cold seal adhesive at the both the first end 18" and the second end 16" of the package 100". The second cold seal closure 21" is provided for closing the second end 16" of the package 100" after the package 100" is filled with, for example, popcorn kernels and/or other ingredients such as oil, during the packaging process.

Cold seal adhesive deposits 20A and 23" are applied in a pattern comprising a band extending around the inner surface of the panels 11"–14" at first and second ends of the package 100" and in a manner substantially the same as the manner of applying the heat seal adhesive 22 as described above with respect to the package illustrated in FIGS. 1–21.

The side panel 13" is provided with a susceptor 24" formed of a paper/metalized polyester film laminate. The susceptor 24" comprises a rectangular patch attached to the package 100" during the package making process. In the present embodiment, the susceptor 24" is substantially the same as described above with respect to the embodiments illustrated in FIGS. 1–21.

The gusseted panels 12" and 14" may be tacked together near the top open end 16" by the use of an aqueous adhesive applied to the opposing exterior surfaces thereof.

As described below, the package 100" may be simultaneously formed, filled and sealed on a form, fill and seal (FFS) machine.

The package 100" is economical to make because the production line (described in detail below) used to make the package 100" may be operated at very high speeds. Unlike with prior package production lines having a heat seal station, the dwell time to form the cold seals of package 100" is significantly shorter than the dwell time necessary to form one or more heat seals.

The package 100" is easy to use because the cold seal closures at both ends of the bag form a peelable closure that, upon the application thereto of heat from a microwave cooking operation, can be opened easily by the manual application of a separating force to the side panels 11" and 14". This construction enables the package 100" to be opened from either end without tearing the bag structure.

Moreover, the cold seal closures in accordance with the invention provides controlled venting whereby the package is vented at one or both ends having the cold seal closure at a desired stage of the microwave cooking. This obviates a problem with prior art packages having heat seal closures at both ends wherein the desired venting fails to occur, thereby resulting in a poorly cooked product.

The present invention further comprises a roll of continuous web having a plurality of successive lengths which may be made into a package suitable for use in microwave cooking, and a method of making a package 100" using said roll. The present invention further comprises a method of using said roll of web material to continuously form a package 100" and to simultaneously fill the package 100" with a desired filler material. A production line for continuously forming a package 100" and simultaneously filling the package 100" is illustrated in FIGS. 24 and 25.

Figure 23:
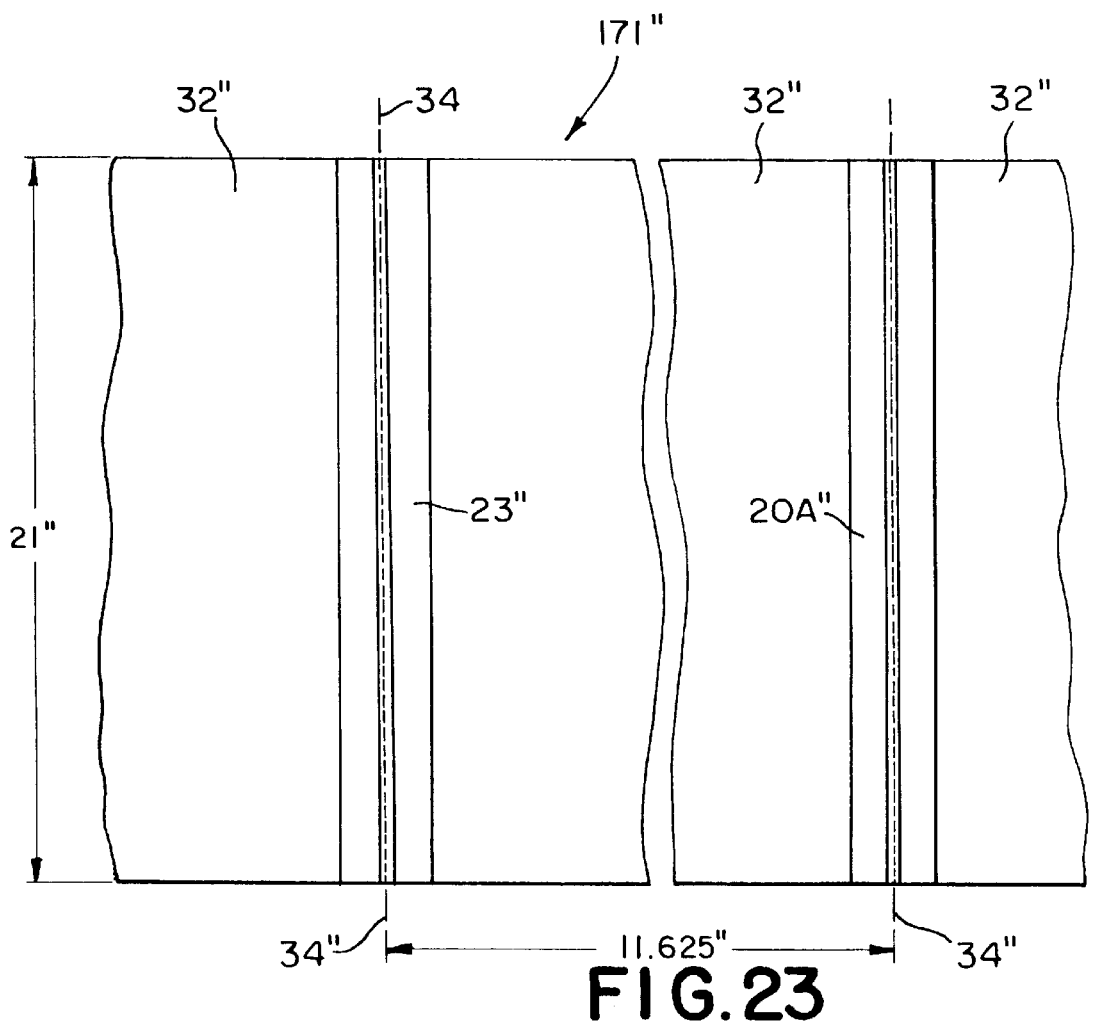
FIG. 23 is a plan view of a part of a web for use in forming a package in accordance with an embodiment of the present invention.
Figure 24:
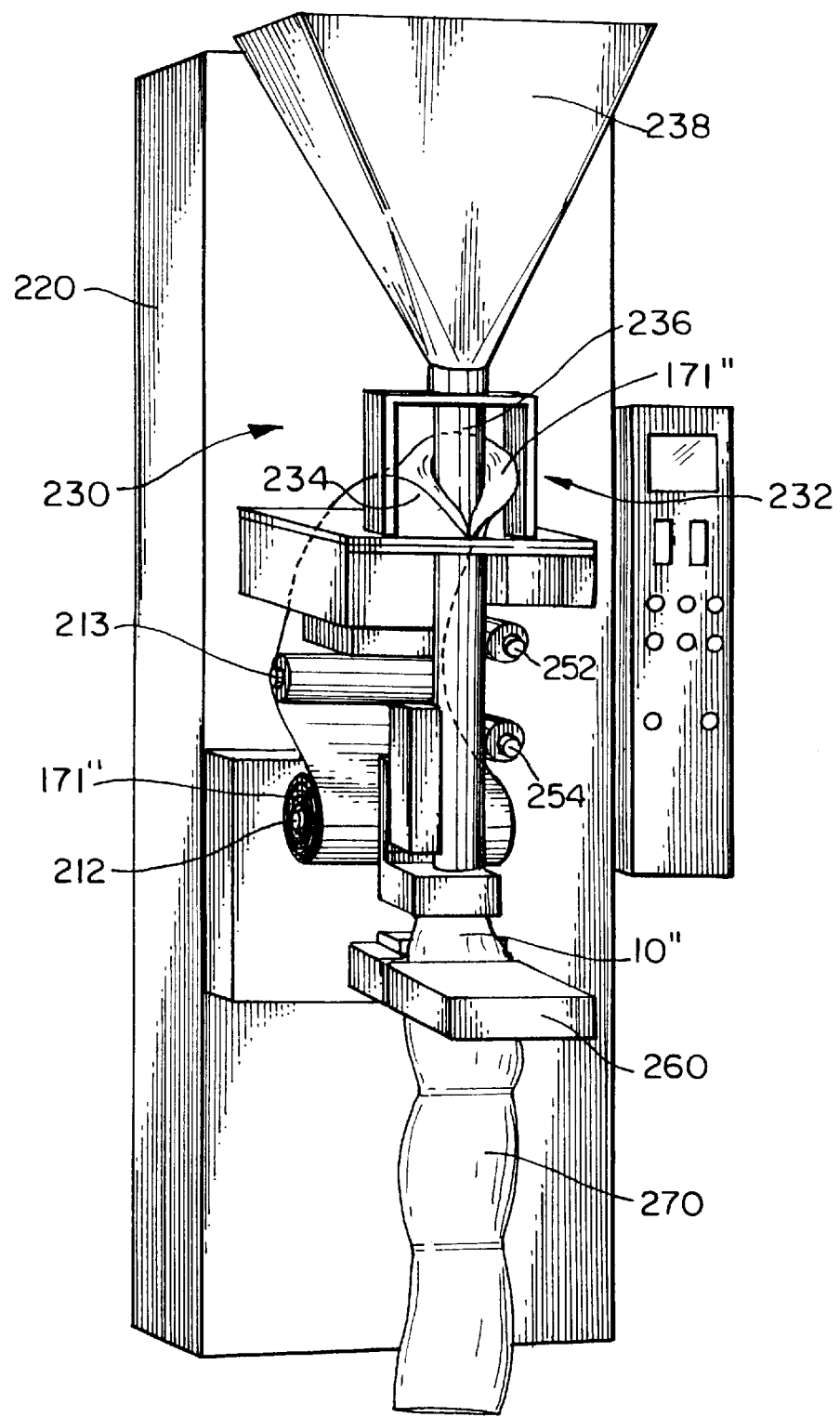
FIG. 24 is a perspective view, partly in diagrammatic form, of a form, fill and seal machine in which a roll in accordance with an embodiment of the invention may be used to form packages in accordance with an embodiment of the invention.

Referring to FIG. 24, a continuous roll of web material 171" is initially provided at the unwind station of a continuous form, fill and seal (FFS) machine 220. The web of flexible material 171" has a plurality of successive web lengths 32" as shown in FIG. 23. Each web length 32" has a first deposit 23" of a cold seal adhesive suitable for forming the first cold seal closure 20" at its one end and a second deposit 20A" of a cold seal adhesive suitable for forming the second cold seal closure 21" of package 100" at its other end. Deposits 20A" and 23" extend transversely across each web length 32" at the ends thereof as shown in FIG. 23. Each web length 32" extends between the two transversely extending cut off lines indicated at 34" located adjacent to and outwardly of adhesive deposits 20A" and 23".

The continuous roll 171" is mounted on a spool 212 with the web being fed from the continuous roll 171" around dancer roll 213 which tensions the web and feeds the web into a tube forming station 230.

Figure 25:
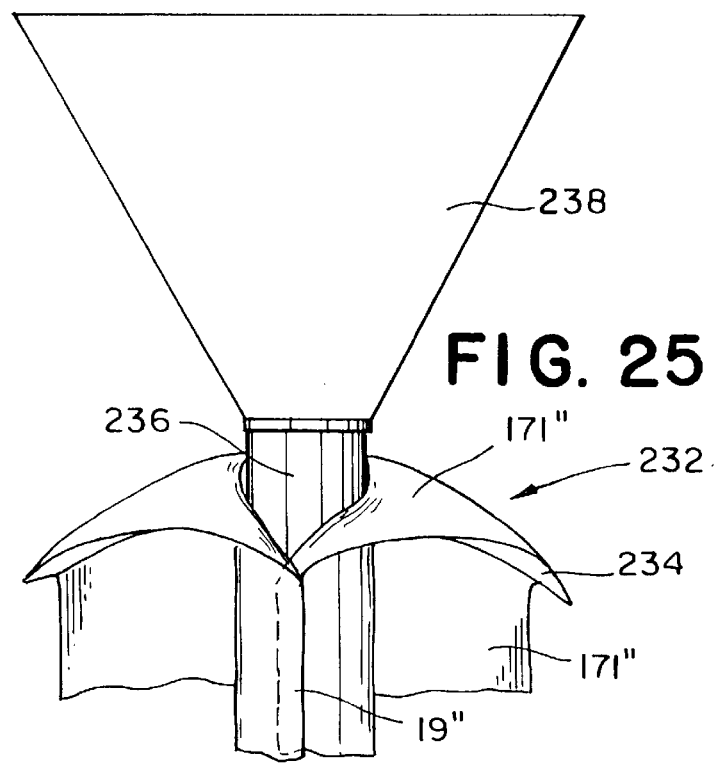
FIG. 25 is an enlarged, front elevational view of the circular mandrel and the tubular mandrel/filling tube of the form, fill and seal machine shown in FIG. 24.
Figure 28:
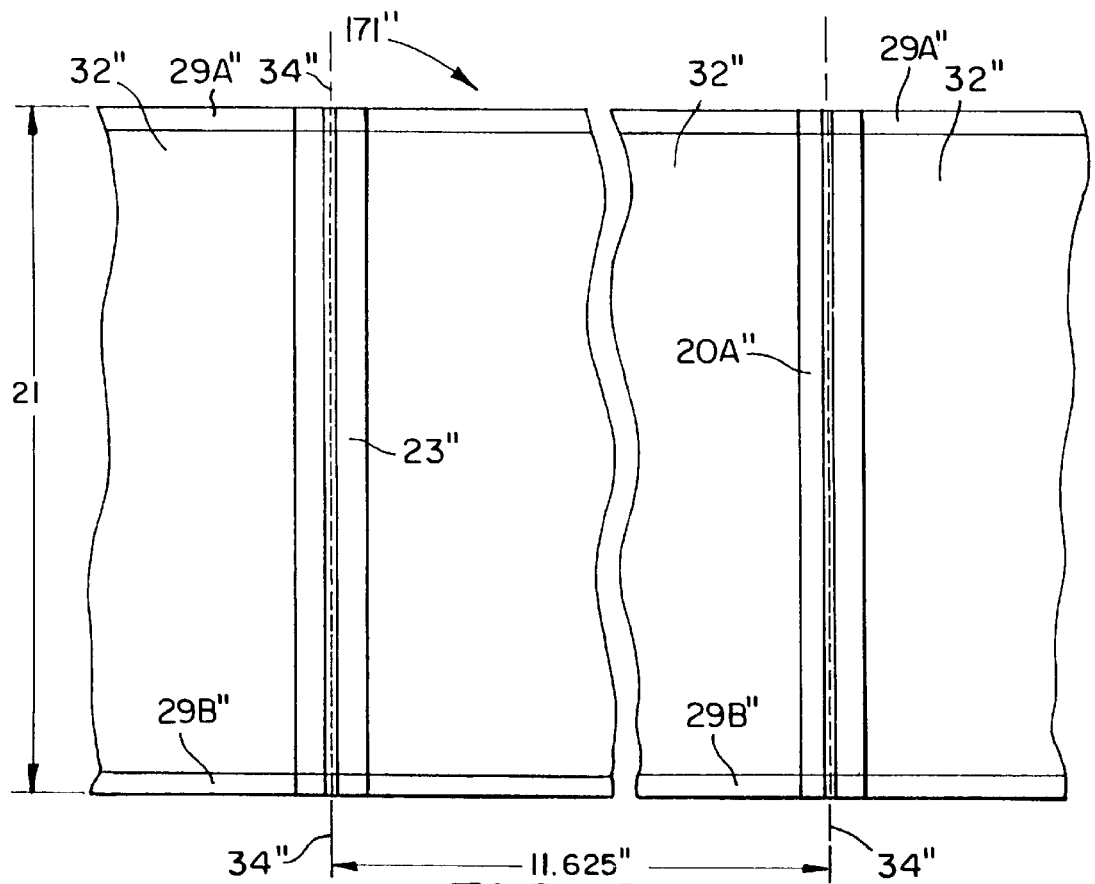
FIG. 28 is a plan view of a part of a web for use in forming a package in accordance with an embodiment of the present invention.

At the tube forming station 230, a continuous tube is formed from the web material by means of a former plate arrangement 232 such as illustrated in FIG. 25. The former plate arrangement includes a circular mandrel 234 and a tubular mandrel/filling tube 236. Because of the tackiness of the cold seal adhesive deposits 20A" and 23" on the web material, a "Teflon" former plate arrangement 232 is used to reduce the friction between the adhesive and the former plate arrangement 232. Referring to FIG. 24, the forming station 230 includes a pair of cooperating rolls 252 and 254 which draw the web material over the circular mandrel 234 and around the tubular mandrel/filling tube 236. Aqueous adhesive is applied to the web material to bond the longitudinal seem 19", and the rolls 252, 254 and the tubular mandrel/filling tube 236 simultaneously apply pressure to the overlapping, longitudinal edges of the web material to form the longitudinal seam 19". The longitudinal seam 19" also may be formed by a pre-applied cold seal adhesive, the web material 171" having pre-applied cold seal adhesive deposits 29A" and 29B" for forming the longitudinal seem 19" which are shown in FIG. 28.

After the continuous tube is advanced through the tube forming station 230, pressure is applied in the area of the first cold seal adhesive deposit to form the first cold seal closure 20". The duration and amount of pressure applied to form the first cold seal closure 20" is controlled by sealing bars 260.

At this stage in the production of the package 100", the package 100" comprises an empty, open-ended bag 10" which may be subsequently filled to form the package 100".

After the first cold seal closure 20" is formed, a preselected portion of the desired filler material is introduced into the tubular web through the tubular mandrel/filling tube 236 which is supplied by a hopper 238. Next, the continuous tube is further advanced to a position whereat the second cold seal closure 21" is formed by the application of pressure in the area of the second cold seal adhesive deposit by the cold seal forming bars 260. Simultaneously, the sealing bars 260 form the first cold seal closure 20" of the next succeeding length of tubular material.

As illustrated and described above, the sealing bars 260 form the bottom and top cold seal closures. However, the FFS machine may be provided with both heat seal and cold seal sealing bars to accommodate a web of material described above having one cold seal adhesive and one heat seal adhesive. In one such embodiment, the heat seal and cold seal bars seal the tube along the heat seal adhesive and cold seal adhesive, respectively, to form the heat seal closure of one bag and form the cold seal closure of the next bag to be filled, respectively. In another such embodiment, the sealing bars 260 may be configured with both heat seal and cold seal sealing bars to accommodate a web of material having one cold seal adhesive and one heat seal adhesive where the cold seal adhesive is used to close the filled bag and the heat seal adhesive is used to form the heat seal closure (the bottom seal) of the next bag to be filled.

As seen in FIG. 24, a continuous string of interconnected packages 270 finally exits the continuous FFS machine. The string of packages 270 may thereafter be shipped to a customer or processed further in this arrangement. Alternatively, the continuous FFS machine may be provided with a cut-off roll which seperates the string into individual packages.

A method of making a roll of single-ply continuous web 171" is substantially the same as the method of making the continuous tubular roll 180 described hereinabove with respect to FIG. 18 except that cold seal adhesive is used in place of the heat seal adhesive of tubular roll 180 and that the continuous web 171" is not formed into a continuous tubular web. Referring to FIG. 26, an unwind station 110" includes a roll 111" of a single ply material of the type described above for making the package 100", said roll 111" being mounted on a spool 112" with the web being fed from the roll 111" around a pair of dancer rollers 113" which feed the web around a roller 114" at the entry of a printing station 120" comprising three pairs of rollers 122", 123", and 124". The pairs of rollers 122" and 123" are constructed and arranged to print onto the web passing therethrough the strips of the cold seal adhesive deposits 20A" and 23", respectively, which are arranged as shown in FIG. 23. If the seam 19" of package 100" is to be formed with a cold seal, strips of cold seal adhesive deposits 29A" and 29B" are also applied to web 171" at the printing station 120". As the web is fed upwardly from the rollers 124" to leave the printing station 120", the web is in the condition such as that shown in FIG. 23, wherein part of a flat web is illustrated, if the seam 19" of package 100" is to be formed with an aqueous adhesive, or in the condition such as that shown in FIG. 28 if the seam 19" of package 100" is to be formed with cold seal adhesives 29A" and 29B". Thus, each web length 32" has a first deposit 23" of a cold seal adhesive suitable for forming the first cold seal closure 20" at a first end and a second deposit 20A" of a cold seal adhesive suitable for forming the second cold seal closure 21" at a second end. Deposits 20A" and 23" extend transversely across each web length 32" at the ends thereof with each length 32" extending between two transversely extending spaced apart cut-off lines indicated at 34" and located adjacent to and outwardly of adhesive deposits 20A" and 23" as shown in FIG. 23. If the seam 19" of package 100" is to be formed with cold seal adhesives 29A" and 29B" rather than with an aqueous adhesive, each web length 32" further includes a strip of cold seal adhesive 29A" which extends lengthwise across the upper edge portion of the web length 32" and a strip of cold seal adhesive 29B" which extends lengthwise across the lower edge portion of the web length 32" as shown in FIG. 28. From the printing station 120", the web is processed in essentially the same manner as described above with respect to the web shown in the production line of FIG. 18 except that the web is not formed into a tubular web. Rather, the continuous web moves from the patching station 146", which is essentially the same as patching station 46 described above, directly to a rewind station 170", which is essentially the same as rewind station 170 described above, where it is wound into a roll of continuous flat material 171".

Figure 27:
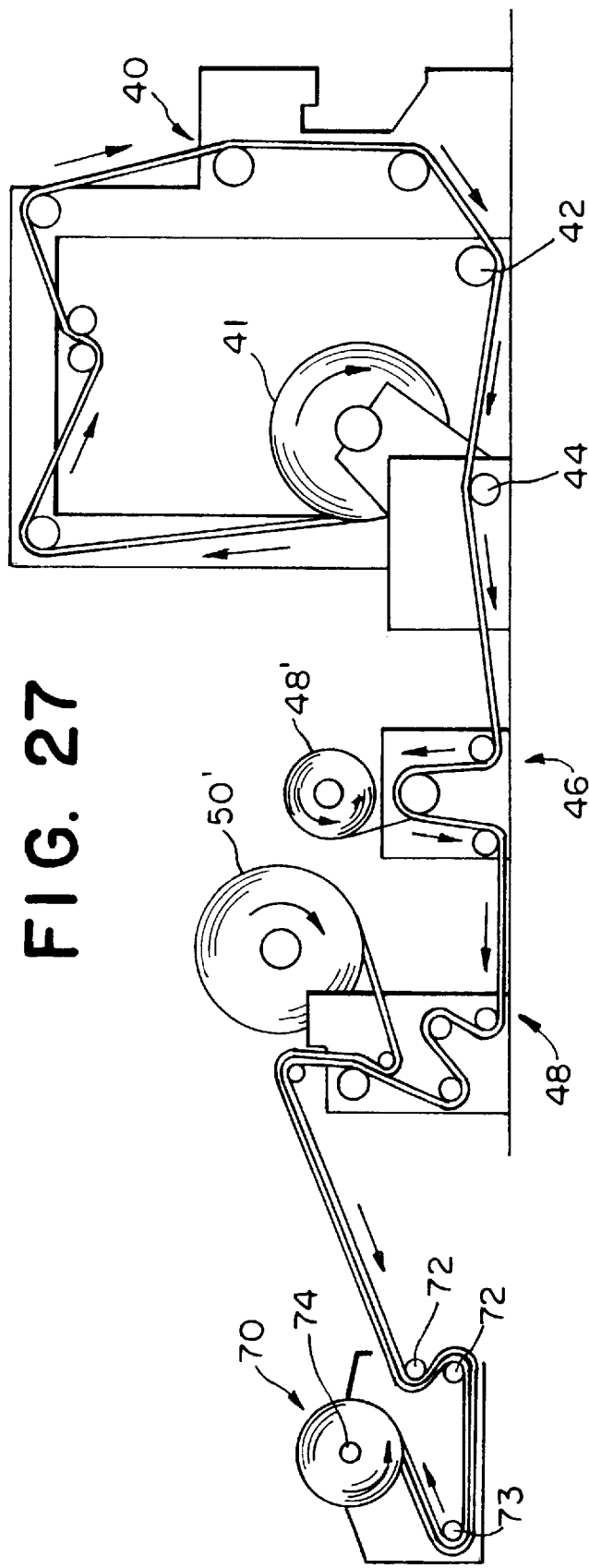
FIG. 27 is a view in side elevation, partly in diagrammatic form, showing a manufacturing process line for making a roll of continuous web from which packages in accordance with an embodiment of the invention may be made.

A method of making a roll of two-ply continuous web 171", which is illustrated in FIG. 27, is substantially the same as the method of making the continuous tubular roll 96 described hereinabove with respect to FIG. 21 except that cold seal adhesive is used in place of the heat seal adhesive of the tubular roll 96 and that the continuous web 171" is not formed into a continuous tubular web. The production line shown in FIG. 27 is similar to that shown in FIG. 21 and comprises the same flexographic printing press 40, the same stations 46 and 48, but does not comprise a tubing forming machine 50. Thus, press 40 has the outer ply of the two-ply material for making package 100" fed therethrough from a coil 41 thereof with the desired ink printing applied to the side of the outer ply which will be formed into the outer surface of the package 100". The outer ply is fed from the press 40 across idler rollers 42 and 44 to work station 46 whereat the susceptor patch is applied to the inner surface of outer ply from a coil 48' thereof. At work station 48, the liner for the package 100" is applied from the preprinted coil 50', which liner has the cold seal adhesive deposit 20A" and the cold seal deposit 23" pre-applied thereto in the arrangement of web lengths 32" as shown in FIG. 23, or which has the cold seal adhesive deposits 20A", 23", 29A" and 29B" pre-applied thereto in the arrangement of web lengths 32" as shown in FIG. 28. The two-ply web with the susceptor patches located between the plies at spaced apart intervals is then fed from the work station 48 to the rewind station 70 whereat the two-ply continuous web 171" is fed to a pair of entry rollers 72 and a roller 73 and wound onto a spool 74 into a roll.

The pre-printed coil 50' may be made by the method described above with reference to FIG. 26 except that the web is moved directly from drying tunnel 125 to rewind station 170".

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

I claim:

1. A package for use in microwave cooking comprising a bag including an elongated tube of flexible material having a plurality of side panels, a first end located at one end of said side panels and a second end located at the other end of said side panels, means for sealing said first end of said tube including a bond of a cold seal adhesive means for bonding the top first end of the tube together such that the bond at ambient temperature cannot be opened without tearing the flexible material of the tube and such that the bond at elevated temperatures produced in microwave cooking softens to form a peelable closure that may be opened without tearing the flexible material of the tube, said cold seal adhesive means located on opposed inner surfaces of said side panels, said cold seal adhesive on said side panels being pressed together to form a first cold seal closure extending across said first end of said tube, and means for sealing said second end of said tube including a bond of a cold seal adhesive on opposed inner surfaces of said side panels, said cold seal adhesive having been subjected to pressure to form a second cold seal closure extending across said second end of said tube, said tube providing an enclosed space located between said first and second closures, and a quantity of microwaveable product contained within said enclosed space.

2. A package according to claim 1 wherein at least one of said cold seal closures form a peelable closure that upon the application of heat from a microwave cooking operation can be opened easily without tearing by the manual application of a separating force which pulls said side panels apart.

3. A package according to claim 2 wherein said cold seal adhesive comprises natural latex cohesive.

4. A package according to claim 2 wherein said tube is formed of a flexible material of a single-ply construction and includes a patch of susceptor material secured to one of said side panels.

5. A package according to claim 2 wherein said tube of flexible material is formed from a two-ply construction and includes a patch of susceptor material located on one of said side panels between said plies of said flexible material.

6. A method of making a package suitable for use in microwave cooking comprising providing a flat web of flexible material, said web of material having a plurality of successive lengths of equal size, each length of said web having a cold seal adhesive means at a first end and a cold seal adhesive means at a second end, said cold seal adhesive means bonding the top first end of the tube together such that the bond at ambient temperature cannot be opened without tearing the flexible material of the tube and such that the bond at elevated temperatures produced in microwave cooking softens to form a peelable closure that may be opened without tearing the flexible material of the tube, forming each length of said flat web into a tubular web having a plurality of opposed side panels, each of said tube lengths having said first and second adhesive deposits at the ends thereof, positioning said tubular web around a fill tube, applying pressure to said opposed side panels of a first tube length in the area of the first cold seal adhesive means to form a first cold seal closure, filling said first tube length with a desired filling material, and applying pressure to said opposed side panels of said first tube length in the area of the second cold seal adhesive means to form a second cold seal closure and thereby form a sealed package, and simultaneously applying pressure to said opposed side panels of a second, next succeeding tube length in the area of the first cold seal adhesive means to form a first cold seal closure on the second tube length.

7. The method according to claim 6 wherein said step of providing a flat web of flexible material with said first and second deposits thereon comprises the steps of feeding a web of material from a roll thereof to a first printing station whereat said first deposit of said cold seal and said second deposit of cold seal are applied to the web, passing said web with said adhesive deposits thereon through a dryer to dry said deposits, and forming said flat web with said deposits into a roll of a flat web material.

8. The method according to claim 7 wherein said web is formed by a pair of plies fed together and including the step of positioning a susceptor patch between said plies so that it is located on one of said side panels.

9. A roll comprising a continuous web having a plurality of lengths constructed and arranged to be made into a package suitable for use in microwave cooking, wherein said web is made of a flexible material and comprises a plurality of successive web lengths of equal size, each web length comprising a first deposit of a cold seal adhesive at a first end and a second deposit of cold seal adhesive at a second end, said cold seal adhesive constructed and arranged to seal the ends of each web length to form a tube from each web length, said cold seal adhesive means bonding the first end of the tube together such that the bond at ambient temperature cannot be opened without tearing the flexible material of the tube, and such that the bond at elevated temperatures produced in microwave cooking softens to form a peelable closure that is openable without tearing the flexible material of the tube.

10. A roll according to claim 9 including a susceptor patch attached to each of said web lengths.

11. A roll according to claim 10 wherein said cold seal adhesive comprises a natural latex cohesive.

12. A method of using a roll of web material comprising a plurality of successive lengths to continuously form a bag and to fill the bag with a desired filler material to form a package comprising providing a roll of flexible web material, said web of material having a plurality of successive lengths of equal size, each length of said web having a cold seal adhesive means at a first end and a cold seal adhesive means at a second end, said cold seal adhesive means bonding the top first end of the tube together such that the bond at ambient temperature cannot be opened without tearing the flexible material of the tube and such that the bond at elevated temperatures produced in microwave cooking softens to form a peelable closure that may be opened without tearing the flexible material of the tube, forming each length of said web into a tubular web having a plurality of opposed side panels, each of said tube lengths having said first and second adhesive means at the ends thereof, positioning said web length around a fill tube, applying pressure to said opposed side panels of a first tube length in the area of the first cold seal adhesive means to form a first cold seal closure, filling said first tube length with a desired filling material, and applying pressure to said opposed side panels of said first tube length in the area of the second cold seal adhesive means to form a second cold seal closure and thereby form a sealed package, and simultaneously applying pressure to said opposed side panels of a second, next succeeding tube length in the area of the first cold seal adhesive means to form a first cold seal closure on the second tube length.

13. The method according to claim 12 wherein said step of providing a web of flexible material with said first and second deposits thereon comprises the steps of feeding a web of material from a roll thereof to a first printing station whereat said first deposit of said first cold seal and said second deposit of said second cold seal are applied to the web, passing said web with said adhesive deposits thereon through a dryer to dry said deposits, and forming said web with said deposits thereon into a roll of web.

14. A bag suitable for use in microwave cooking comprising an elongated tube of flexible material having a plurality of side panels, a first end located at one end of said side panels, and a second end located at the other end of said side panels, means for sealing said first end of said tube including a deposit of cold seal adhesive located proximate the first end on opposed inner surfaces of said side panels, said cold seal adhesive means bonding the top first end of the tube together such that the bond at ambient temperature cannot be opened without tearing the flexible material of the tube and such that the bond at elevated temperatures produced in microwave cooking softens to form a peelable closure that may be opened without tearing the flexible material of the tube, said cold seal adhesive on said side panels being pressed together to form a first cold seal closure extending across said first end of said tube, and means for sealing said second end of said tube including a deposit of a cold seal adhesive located proximate the second end on opposed inner surfaces of said side panels, said cold seal adhesive being responsive to the application of pressure thereto to form a cold seal closure extending across said second end of said tube.

15. A bag according to claim 14 wherein both of said cold seal closures form a peelable closure that upon the application of heat from a microwave cooking operation can be opened easily without tearing by the manual application of a separating force which pulls said side panels apart.

16. A bag according to claim 15 wherein said cold seal adhesive is comprised of natural latex cohesive.

17. A bag according to claim 16 wherein said tube is formed of flexible material of a single ply construction and includes a patch of susceptor material to one of said side panels.

18. A bag according to claim 16 wherein said tube of flexible material is formed from a two-ply construction and includes a patch of susceptor material located on one of said side panels between said plies of said flexible material.

19. A method of making a package suitable for use in microwave cooking comprising providing a flat web of flexible material, said web of material having a plurality of successive lengths of equal size, each length of said web having a heat seal adhesive means at a first end and a cold seal adhesive means at a second end, said cold seal adhesive means bonding the top first end of the tube together such that the bond at ambient temperature cannot be opened without tearing the flexible material of the tube and such that the bond at elevated temperatures produced in microwave cooking softens to form a peelable closure that may be opened without tearing the flexible material of the tube, forming each length of said flat web into a tubular web having a plurality of opposed side panels, each of said tube lengths having said first and second adhesive deposits at the ends thereof, positioning said tubular web around a fill tube, applying heat and pressure to said opposed side panels of a first tube length in the area of the heat seal adhesive means to form a heat seal closure, filling said first tube length with a desired filling material, and applying pressure to said opposed side panels of said first tube length in the area of the cold seal adhesive means to form a cold seal closure and thereby form a sealed package and simultaneously applying heat and pressure to said opposed side panels of a second, next succeeding tube length in the area of the heat seal adhesive means to form a heat seal closure on the second tube length.

20. The method according to claim 19 wherein said step of providing a flat web of flexible material with said first and second deposits thereon comprises the steps of feeding a web of material from a roll thereof to a first printing station whereat said first deposit of said heat seal adhesive and said second deposit of cold seal adhesive are applied to the web, passing said web with said adhesive deposits thereon through a dryer to dry said deposits, and
forming said flat web with said deposits into a roll of a web material.

* * * * *